United States Patent
Rygula et al.

(10) Patent No.: US 6,973,309 B1
(45) Date of Patent: Dec. 6, 2005

(54) METHOD AND SYSTEM FOR RE-DIRECTION AND HANDOFF FOR PRE-PAID MOBILE SERVICES IN THIRD GENERATION NETWORKS

(75) Inventors: Charles Rygula, Palatine, IL (US); Chandra Warrier, Schaumburg, IL (US); Michael S. Borella, Naperville, IL (US)

(73) Assignee: UTStarcom, Inc., Alameda, CA (US)

( * ) Notice: Subject to any disclaimer, the term of this patent is extended or adjusted under 35 U.S.C. 154(b) by 762 days.

(21) Appl. No.: 10/097,796

(22) Filed: Mar. 14, 2002

(51) Int. Cl.[7] .............................................. H04Q 7/20
(52) U.S. Cl. ...................... 455/436; 455/406; 455/408; 455/511; 370/338; 370/395.52
(58) Field of Search ................ 455/405–409, 455/410, 411, 436–438, 511; 370/338, 349, 370/352, 389, 395.1, 395.5, 395.52, 401

(56) References Cited

U.S. PATENT DOCUMENTS

| | | | |
|---|---|---|---|
| 6,185,414 B1 * | 2/2001 | Brunner et al. | 455/406 |
| 2002/0046277 A1 * | 4/2002 | Barna et al. | 709/224 |
| 2002/0102962 A1 * | 8/2002 | Grinn et al. | 455/406 |
| 2002/0111153 A1 * | 8/2002 | Hartmaier et al. | 455/406 |
| 2002/0156729 A1 * | 10/2002 | Nilson | 705/40 |
| 2003/0031160 A1 * | 2/2003 | Gibson Ang et al. | 370/349 |
| 2003/0083042 A1 * | 5/2003 | Abuhamdeh | 455/406 |
| 2003/0083067 A1 * | 5/2003 | Hanson | 455/433 |
| 2003/0206533 A1 * | 11/2003 | Charas | 370/328 |
| 2005/0020263 A1 * | 1/2005 | Sherman et al. | 455/435.1 |

* cited by examiner

Primary Examiner—William Trost
Assistant Examiner—James D. Ewart
(74) Attorney, Agent, or Firm—Fitch, Even, Tabin & Flannery

(57) ABSTRACT

A method and system for re-direction and handoff for pre-paid mobile services in third generation ("3G") networks. A handoff marker is created and used for wireless mobile nodes such as Mobile Internet Protocol ("Mobile IP") nodes. The handoff markers allow the wireless mobile nodes to use pre-paid mobile services, have active communications sessions suspended and re-directed to a registration server when purchased pre-paid mobile services run-out. The registration server allows the wireless mobile node to electronically purchase additional pre-paid mobile services and immediately resume a suspended communications session. The handoff markers also allows network devices in a mobile network to determine between initiation of a new communications session or a hard handoff of an existing communication session, without adversely affecting pre-paid billing services.

9 Claims, 23 Drawing Sheets

SEND THE GENERATED HANDOFF MARKER TO AN AUTHENTICATION AUTHORIZATION AND ACCOUNTING SERVER TO ALLOW THE AUTHENTICATION AUTHORIZATION AND ACCOUNTING SERVER TO DIFFERENTIATE BETWEEN THE ESTABLISHMENT OF A NEW COMMUNICATIONS SESSION AND A HANDOFF OF AN EXISTING COMMUNICATIONS SESSION TO ANOTHER NON-MOBILE SERVICE NETWORK DEVICE — 198

↓

RECEIVE AN ACCESS RESPONSE MESSAGE ON THE FIRST NON-MOBILE NETWORK SERVICE DEVICE FROM THE AUTHENTICATION AUTHORIZATION AND ACCOUNTING SERVER, WHERE THE ACCESS RESPONSE MESSAGE INCLUDES ACCOUNT INFORMATION FOR PRE-PAID MOBILE SERVICES PURCHASED FOR THE WIRELESS MOBILE NODE THAT WILL BE USED BY THE FIRST NON-MOBILE SERVICE NETWORK DEVICE TO PROVIDE PRE-PAID BILLING SERVICES FOR THE WIRELESS MOBILE NODE — 200

↓

SEND THE GENERATED HANDOFF MARKER TO THE SECOND NON-MOBILE NETWORK DEVICE CONTROL NODE — 202

↓

END (B)

↓

CHANGE THE VALUE OF THE HANDOFF MARKER TO CREATE A MODIFIED HANDOFF MARKER TO INDICATE THE WIRELESS MOBILE NODE IS UNDERGOING A HANDOFF OF AN EXISTING COMMUNICATIONS SESSION TO ANOTHER NON-MOBILE SERVICE NETWORK DEVICE — 204

↓

SEND THE MODIFIED HANDOFF MARKER TO THE AUTHENTICATION AUTHORIZATION AND ACCOUNTING SERVER TO ALLOW THE AUTHENTICATION AUTHORIZATION AND ACCOUNTING SERVER TO DIFFERENTIATE BETWEEN THE ESTABLISHMENT OF A NEW COMMUNICATIONS SESSION AND THE HANDOFF OF AN EXISTING COMMUNICATIONS SESSION TO ANOTHER NON-MOBILE SERVICE NETWORK DEVICE — 206

→ END

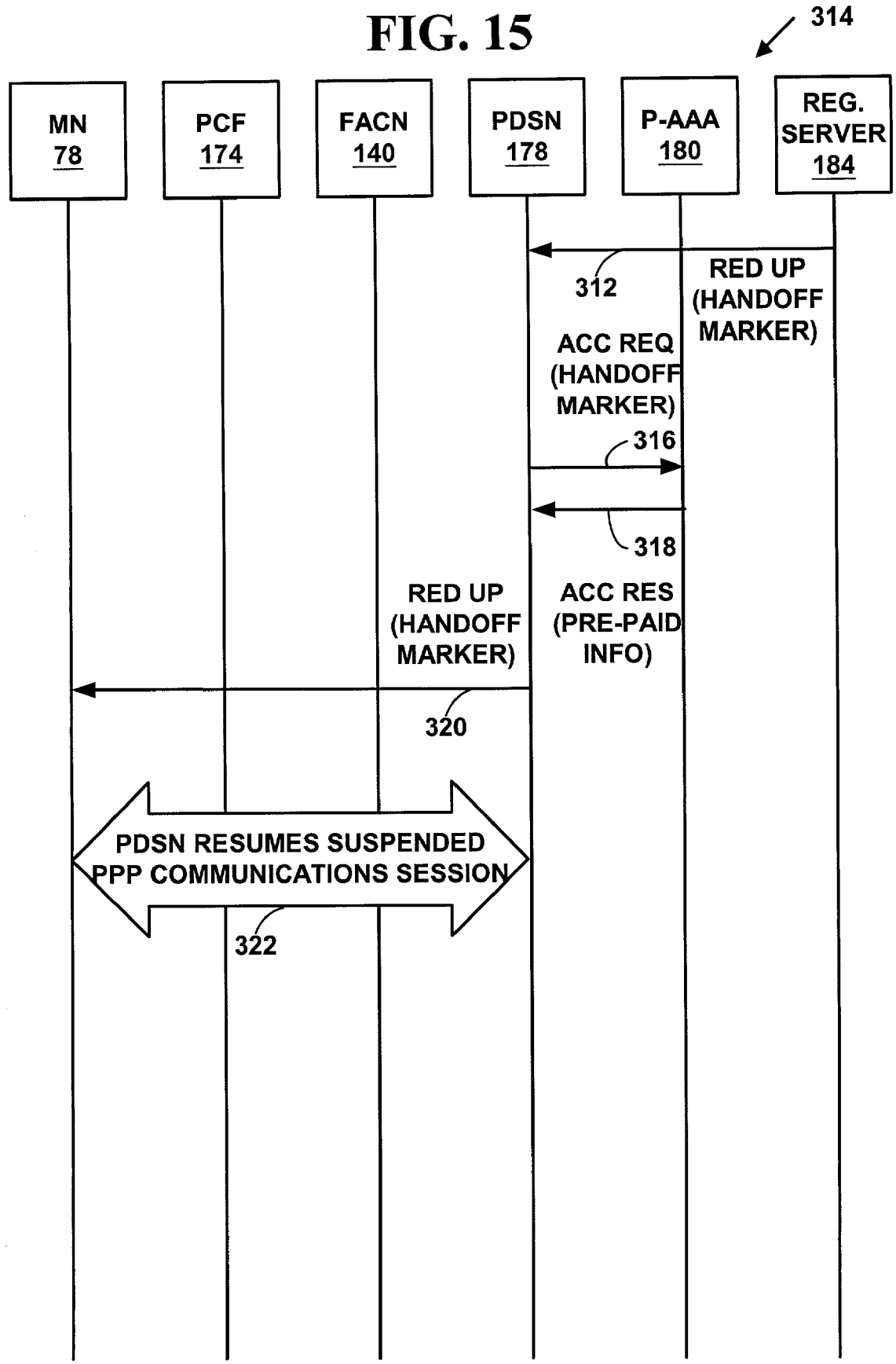

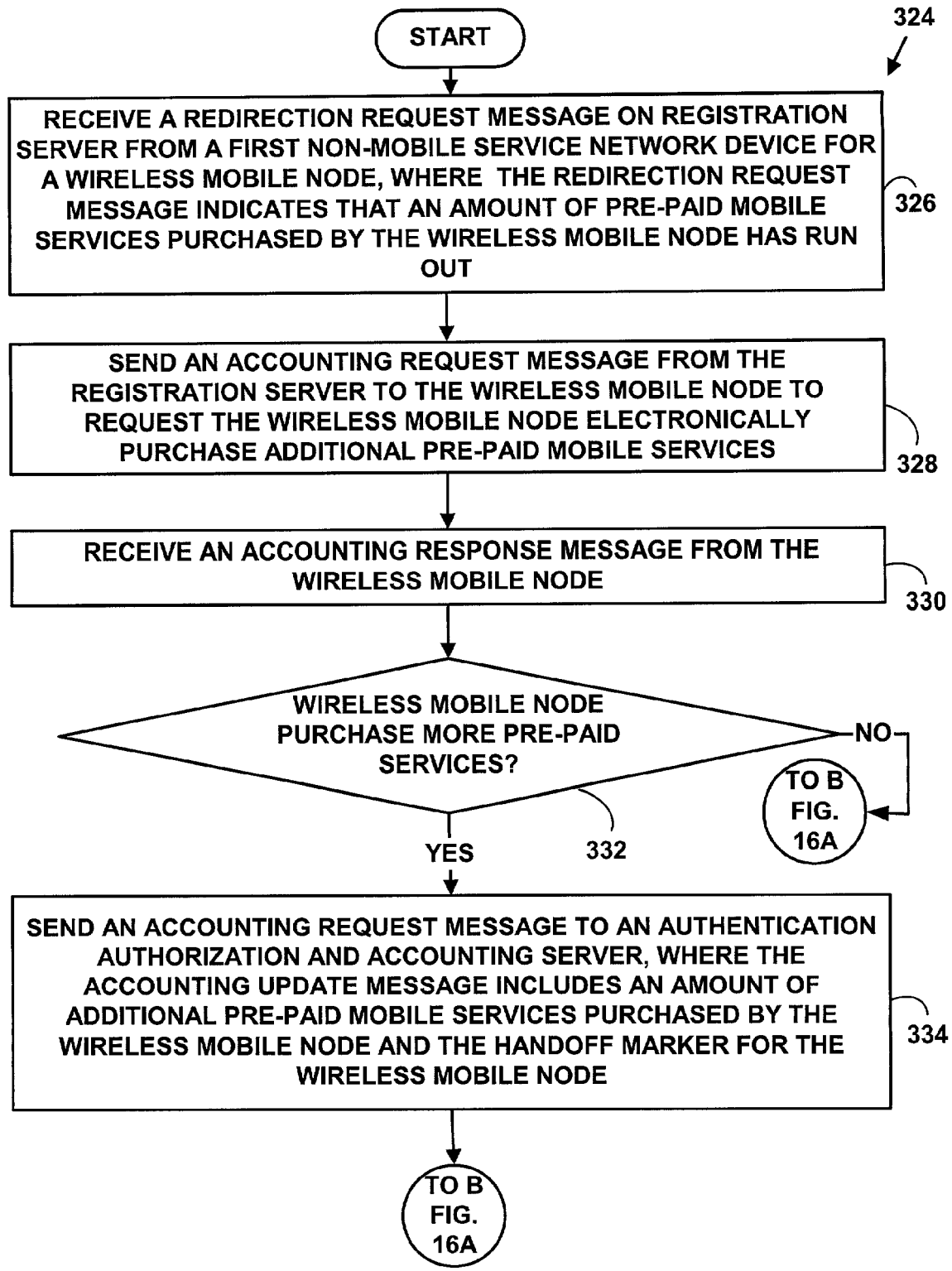

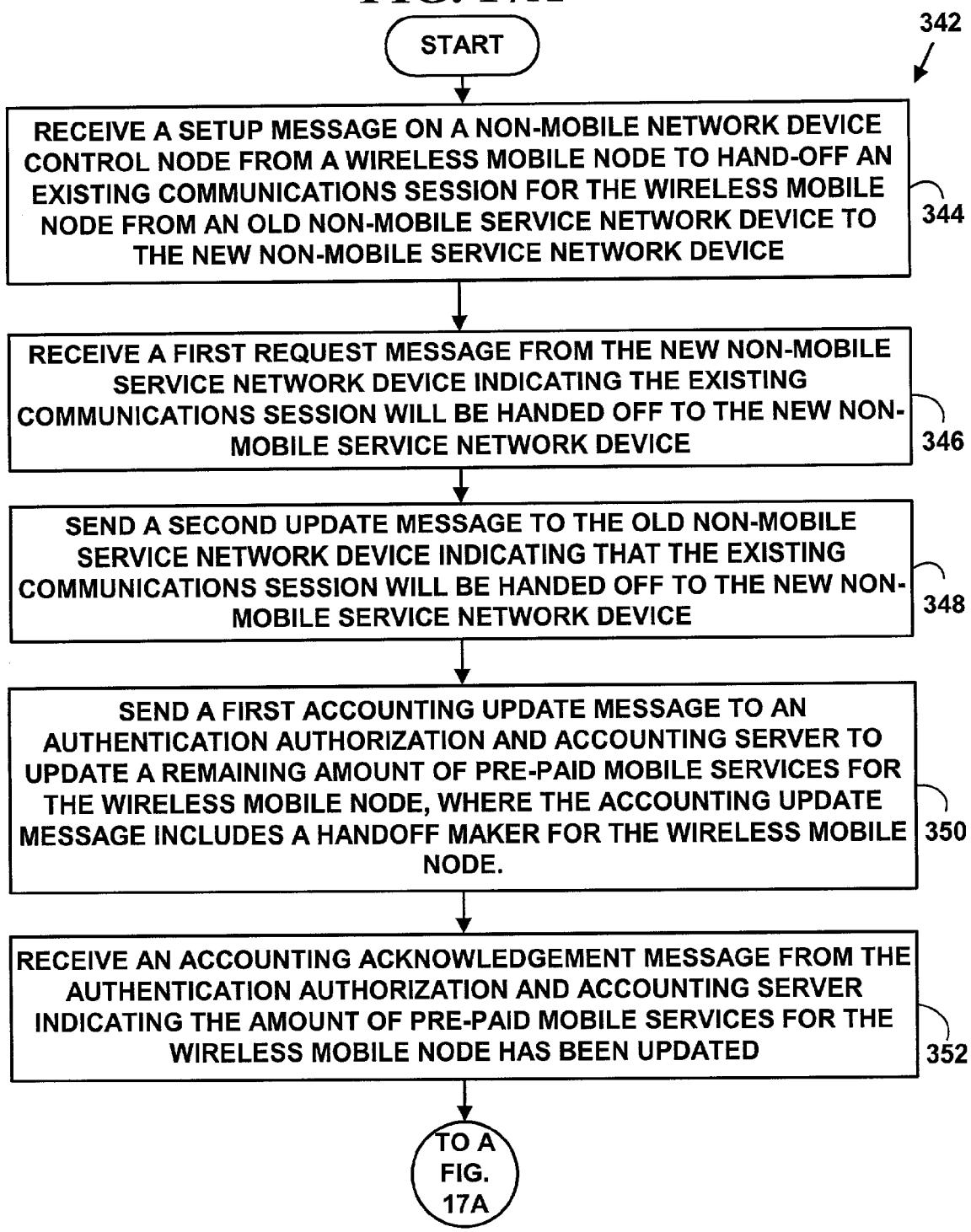

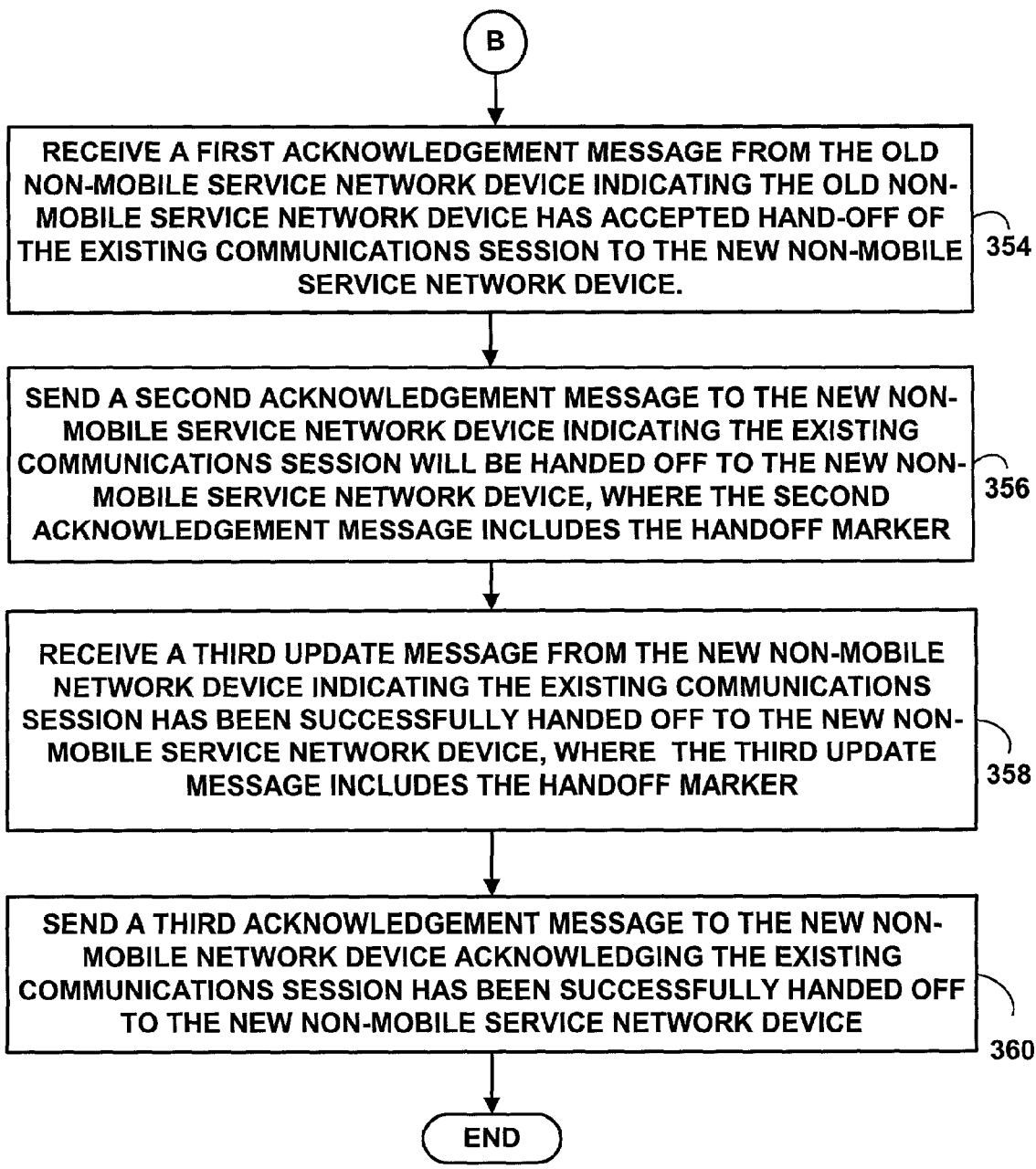

TO FIG. 18B

METHOD AND SYSTEM FOR RE-DIRECTION AND HANDOFF FOR PRE-PAID MOBILE SERVICES IN THIRD GENERATION NETWORKS

FIELD OF INVENTION

This invention relates to communications on computer networks. More specifically, it relates to a method and system for re-direction and handoff for pre-paid mobile services in third generation networks.

BACKGROUND OF THE INVENTION

The Internet Protocol ("IP") is an addressing protocol designed to route traffic within a network or between networks. The Internet Protocol is used on many computer networks including the Internet, intranets and other networks. Internet Protocol addresses are typically assigned to "non-mobile" nodes on a network. An non-mobile network device may be moved to a different computer network, but is typically associated with a static physical location (e.g., a building at 3Com Corporation in Santa Clara, Calif.) and an non-mobile Internet protocol address.

The Mobile Internet Protocol (hereinafter Mobile IP) allows mobile nodes called "mobile nodes" to transparently move between different Internet Protocol sub-networks ("subnets"). Mobile nodes typically include mobile phones, personal digital/data assistants ("PDAs") and other types of mobile devices. Internet Protocol addresses are typically assigned to mobile nodes based on their home Internet Protocol subnet. The home subnet is connected to an external network (e.g., the Internet or an intranet) with a "home agent" that serves as the subnet's gateway router. As is known in the art, the gateway connects computer networks using different networking protocols or operating at different transmission capacities. As is known in the art, a router translates differences between network protocols and routes data packets to an appropriate network node or network device.

When a mobile node "roams," (i.e., dynamically changes its physical location), it periodically transmits "agent solicitation" messages to other gateway routers. A mobile node also listens for "agent advertisement" messages from other gateway routers. When a mobile node receives an agent advertisement message indicating that it is now on a foreign subnet, it registers with the foreign gateway router or "foreign agent" and its home agent. The registration with the home agent indicates the mobile node is away from "home" (i.e., away from its home subnet). The registration with the foreign agent allows the mobile node to receive data on the foreign subnet.

Most mobile nodes are currently being used with second generation ("2G") services. As is known in the art, 2G services are typically based on older circuit-switched or packet-switched technologies that makes transmission of video and data quite slow and thus limits the type of multimedia, video and data services that can be used. Current 2G networks can typically support data rates up to about 64K bits-per-second ("bps") or more. Some mobile nodes are also using newer second-and-a-half generation ("2.5G") network services. As is known in the art, 2.5G networks use newer packet-switched services that increase transmission speeds for video and data compared to 2G networks. Current 2.5G networks can typically support data rates up to about 200K bps.

Mobile nodes are now being developed and used to take advantage of third generation ("3G") network services. As is known in the art, current 3G architecture supports data rates ranging from about 144K bps to about 2M bps or more, packet switched services. The significantly faster 3G data rates allow a broader range of multimedia, video and data services to be used on a roaming mobile node.

The 3G packet switched services include Internet Protocol traffic, including Mobile IP traffic, symmetrical and asymmetrical data rates, multimedia services including video conferencing and streaming video, international roaming among different 3G operating environments. Typical 3G systems include packet-based transmission of digitized voice, data and video. 3G networks encompass a range of wireless technologies including Code Division Multiple Access ("CDMA"), Universal Mobile Telecommunications Service ("UMTS") Wide-band CDMA ("WCDMA") and others.

As is known in the art, CDMA is a digital communications technology that uses spread-spectrum communication techniques. CDMA does not assign a specific frequency to each user. Instead, every CDMA communications channel can use the full available communications spectrum. Individual conversations are encoded with a pseudo-random digital sequence.

As is known in the art, UMTS is a 3G mobile technology that delivers broadband information at speeds up to 2M bps. Besides voice and data UMTS delivers audio and video to wireless devices anywhere in the world through fixed, wireless and satellite systems.

3G networks including wireless technologies allow mobile nodes that roam from network-to-network to use Mobile IP. Mobile IP can be used to establish a voice, video and/or data call from a mobile node that has roamed from its home network to a foreign network. Such a voice or data call is typically established using call control and other protocols such as Session Initiation Protocol ("SIP"), H.323, Authentication Authorization and Accounting ("AAA"), Domain Name System ("DNS") (e.g., for IP address decoding, etc.), etc.

However, there are several problems associated with establishing voice, video or data calls on 3G networks. One problem is that users currently cannot easily buy, use or replenish prepaid services such as pre-paid calling accounts on mobile nodes on some 3G networks. Such 3G networks typically occur in rural areas and in developing countries where a normal billing system doesn't work or a 3G network provider will not undertake providing 3G services to high-risk, users. In many rural areas and developing countries, the mail system or wired telephone system is so poor that there may be large delays in receiving payments and/or bills resulting in disconnecting of a user's 3G network services.

Another problem is that it is difficult to disconnect active users of mobile nodes when outstanding fees are owed, and the active users of the mobile nodes are constantly roaming from one foreign network to another on a 3G network. Another problem is that it is difficult for users of mobile nodes on 3G network to re-establish service if fees are paid and pre-paid billing systems are not implemented.

Another problem is that hard handoffs between Packet Data Serving Nodes ("PDSN") in a 3G network are difficult when a mobile node roams to new location affects pre-paid billing features. As is known in the art, a PDSN is a point of entry into a 3G wireless packet data network. The PDSN performs two basic functions: (1) it exchanges packets with a mobile node over a wireless network; and (2) it exchanges packets with other Internet Protocol networks. The PDSN uses associated AAA servers for user authentication and traffic management.

If an old session is allowed to time out at a source PDSN while a new one is initiated at a target PDSN for a hard handoff, an AAA server will disallow the new session because it will consider the mobile node to be logged into two PDSNs at the same time. However, even if the old session is dropped before the new one is established on hard handoff to the target PDSN, the AAA server may determine that the mobile node just disconnected then reconnected to the same source PDSN.

If the old session is dropped before the new one is established on a hard handoff, service provider's freedom in deploying new or innovative billing services is limited. For example, the service provider may want to deploy a service such as give a mobile node's first five minutes of a data session free, then the mobile node is charged by the minute afterwards. In the scenarios just described, a pre-paid billing system could mistakenly give the mobile node a free five minutes on every hard handoff to a new PDSN as a mobile node changes locations, since such hard handoffs are not handled properly.

This it is desirable to provide a method and system to support prepaid accounting and billing services that work correctly with hard handoff for mobile nodes on 3G networks. The prepaid accounting and billing services should also support correct hard handoff support as mobile nodes roam to new locations.

SUMMARY OF THE INVENTION

In accordance with preferred embodiments of the present invention, some of the problems associated using mobile nodes on 3G networks are overcome. A method and system for re-direction and handoff for pre-paid mobile services in third generation networks is presented.

One aspect of the invention includes creating and using handoff markers for wireless mobile nodes, such as wireless Mobile Internet Protocol ("Mobile IP") nodes, using pre-paid mobile services, such as wireless voice, video and/or data services. The handoff markers help allow automatic re-direction and hard handoff of communication sessions established by wireless mobile nodes. Another aspect of the invention includes methods for providing automatic re-direction of wireless mobile nodes, such as wireless Mobile Internet Protocol ("Mobile IP") nodes, when purchased pre-paid services run out. Another aspect of the invention includes methods for providing hard handoffs of communications sessions for a wireless mobile node using pre-paid mobile services, from an old PDSN to a new PDSN.

The methods system may allow network devices in a mobile network (e.g., a PDSN, an AAA server, a foreign agent, etc.) to determine between a new communications session or a hard handoff of an existing communication session without adversely affecting pre-paid mobile billing services.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present inventions are described with reference to the following drawings, wherein:

FIG. 15 is a block diagram illustrating an exemplary message flow for;

FIGS. 16A and 16B are a flow diagram illustrating a method for resuming forced re-direction handoffs for wireless mobile nodes using pre-paid mobile services on a mobile network;

FIGS. 17A and 17B are a flow chart illustrating a method for allowing hard handoffs for wireless mobile nodes using pre-paid mobile services on a mobile network.

DETAILED DESCRIPTION OF PREFERRED EMBODIMENTS

Exemplary Network System

Figure 1:
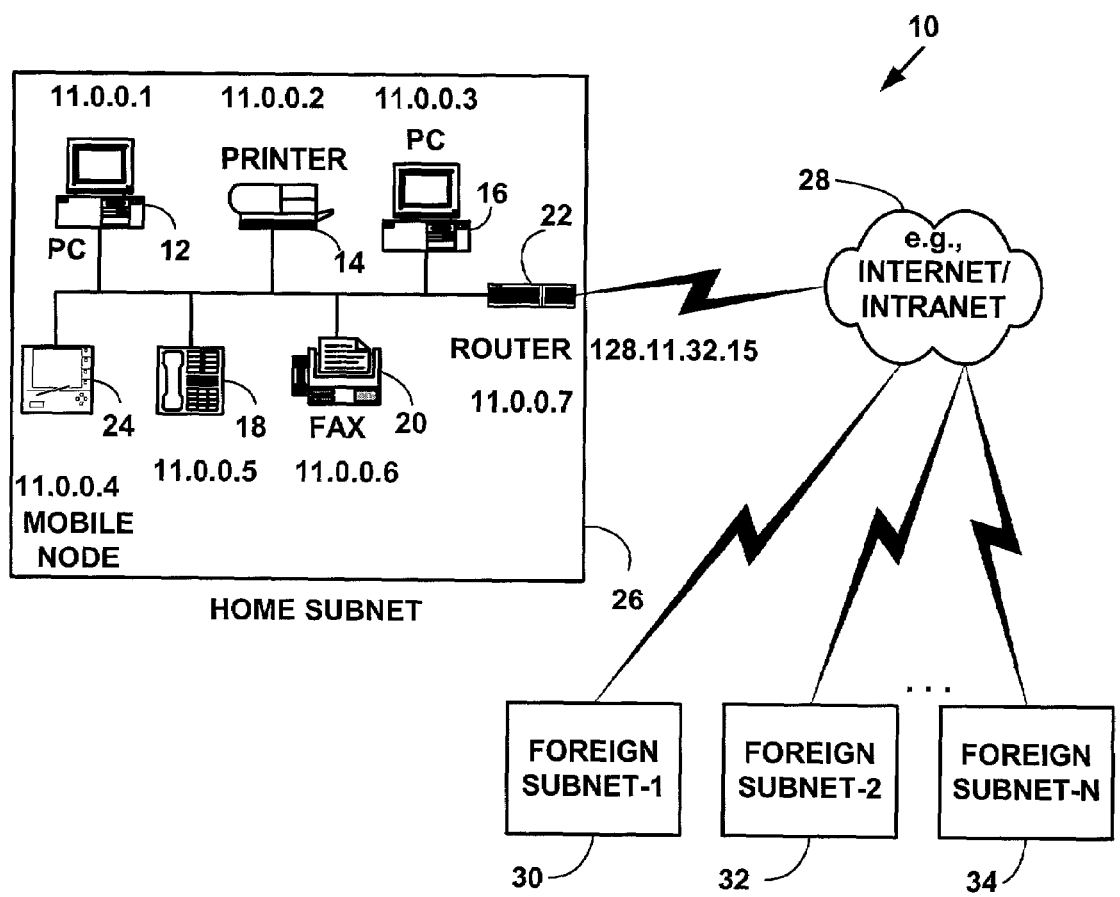
FIG. 1 is a block diagram illustrating an exemplary network system.

FIG. 1 is a block diagram illustrating an exemplary network system 10 for preferred embodiments of the present invention. The network system 10 includes one or more local network devices 12, 14, 16, 18, 20, 22, 24, seven of which are illustrated. However, more or fewer local network devices can also be used. The local network devices are assigned network addresses (e.g., 11.0.0.x) on a local subnet 26 as is illustrated in FIG. 1. The local subnet 26 includes but is not limited to, a wireless network, a wired network, a wireless or wired LAN, an optical network or a cable network. However, other computer networks can also be used.

The local subnet 26 is connected to an external network 28 such as the Internet or an intranet via gateway router 22. As is known in the art, a gateway connects computer networks using different networking protocols or operating at different transmission capacities. As is known in the art, a router translates differences between network protocols and routes data packets to an appropriate network node or network device. Local network devices on the local subnet 26 can reach one or more remote network devices on foreign subnets 30, 32, 34, via the external network 28.

Figure 3:
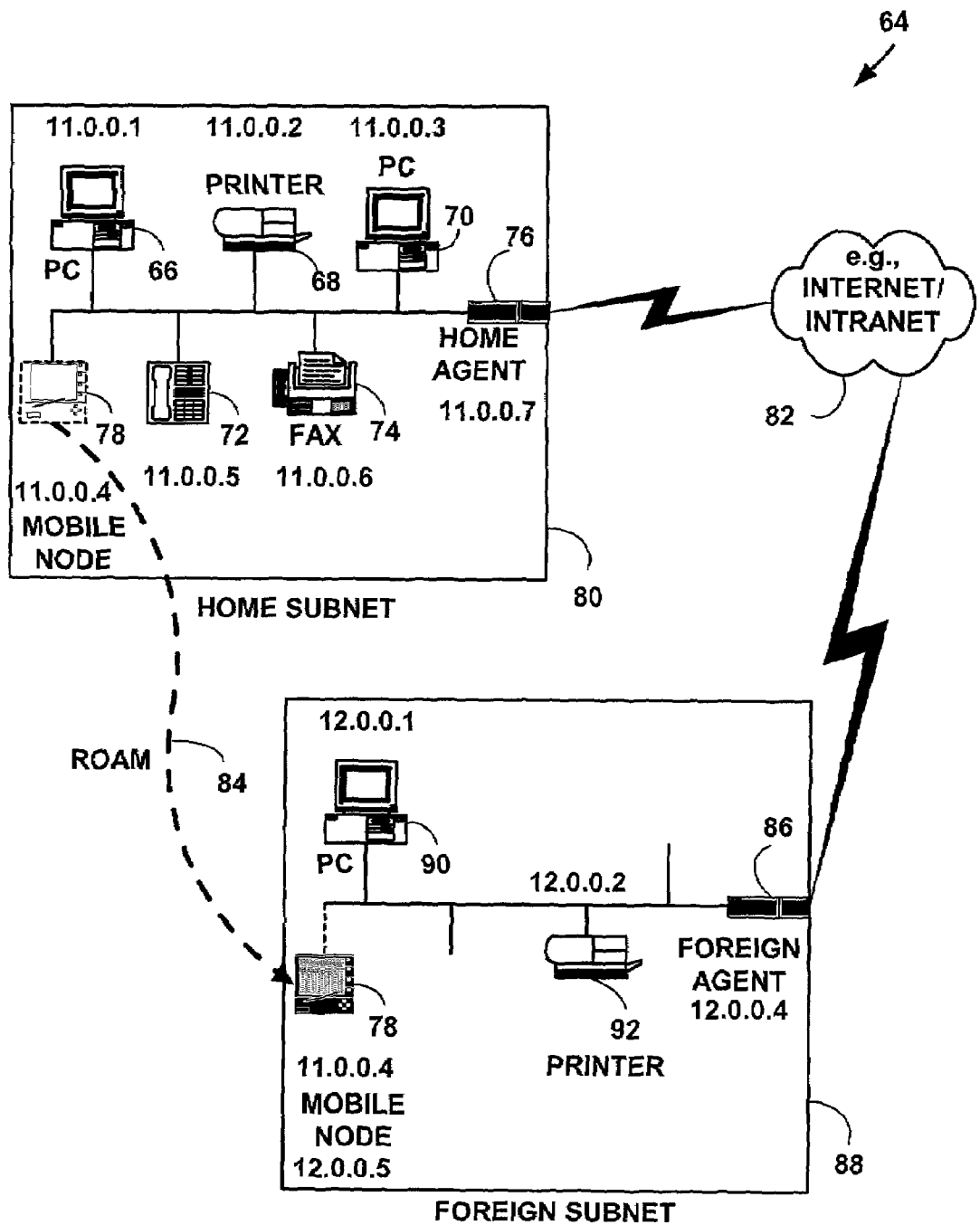
FIG. 3 is a block diagram illustrating an exemplary Mobile Internet Protocol system.

Network devices for preferred embodiments of the present invention include network devices that can interact with network system 10 and the exemplary mobile network system of FIG. 3 based on all or selected portions of standards proposed by the Data-Over-Cable-Service-Interface-Specification ("DOCSIS") standards from the Multimedia Cable Network Systems ("MCNS"), the Institute of Electrical and Electronic Engineers ("IEEE"), International Telecommunications Union-Telecommunication Standardization Sector ("ITU"), Telecommunications Industry Association ("TIA"), Internet Engineering Task Force ("IETF"), and/or Wireless Application Protocol ("WAP") Forum. However, network devices based on other standards could also be used. DOCSIS standards can be found on the World Wide Web at the Universal Resource Locator ("URL") "www.cablemodem.com." IEEE standards can be found at the URL "www.ieee.org." The ITU, (formerly known as the CCITT) standards can be found at the URL "www.itu.ch." TIA standards can be found at the URL "www.tiaonline.org." IETF standards can be found at the URL "www.ietf.org." The WAP standards can be found at the URL "www.wapforum.org."

An operating environment for network devices and routers of the present invention include a processing system with at least one high speed Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed," or "processor-executed."

It will be appreciated that acts and symbolically represented operations or instructions include the manipulation of electrical signals or biological signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Exemplary Protocol Stack

Figure 2:
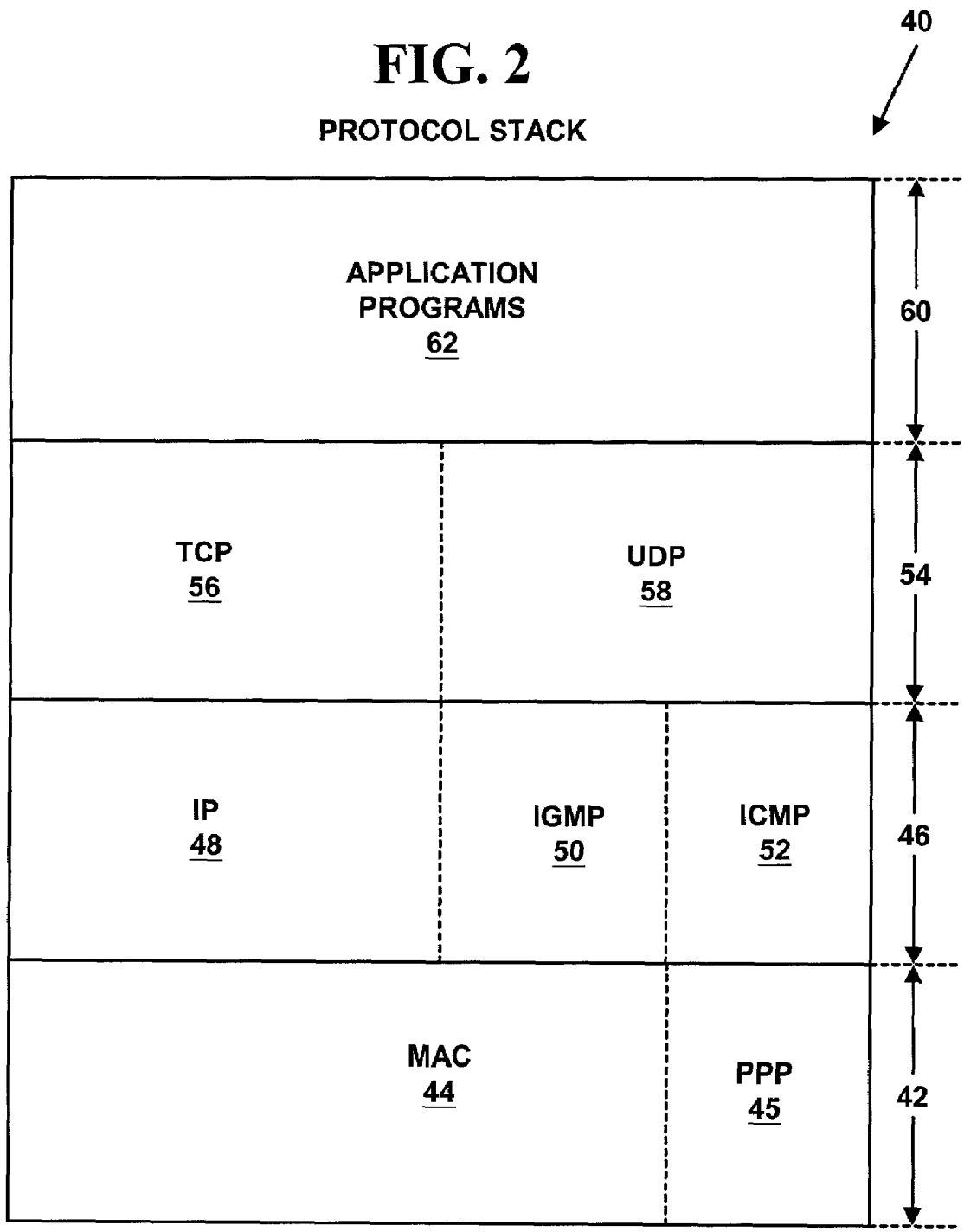
FIG. 2 is a block diagram illustrating a protocol stack for the network devices.

FIG. 2 is a block diagram illustrating an exemplary layered protocol stack 40 for mobile and non-mobile network devices from the exemplary network system 10 (FIG. 1) and the exemplary mobile network system of FIG. 3. The layered protocol stack 40 is described with respect to Internet Protocol suites comprising from lowest-to-highest, a link, network, transport and application layer. However, more or fewer layers could also be used, and different layer designations could also be used for the layers in the protocol stack 40 (e.g., layering based on the seven layer Open Systems Interconnection ("OSI") model).

The layered protocol stack 40 is used to connect a network device to an underlying physical transmission medium comprising a wireless network, wired network, wireless or wired LAN, an optical network or a cable network. However, other computer networks can also be used and the present invention is not limited to these networks. The underlying physical transmission medium is also called a physical layer (not illustrated in FIG. 2). As is known in the art, a physical layer defines the electrical and physical properties of an underlying transmission medium.

A link layer 42 is used to connect network devices to the underlying physical transmission medium or physical layer. The link layer 42 includes a Medium Access Control ("MAC") protocol layer 44. As is known in the art, the MAC layer 44 controls access to the underlying transmission medium via a physical layer. For more information on the MAC layer protocol see IEEE 802.3, incorporated herein by reference. However, the present invention is not limited to a MAC layer protocol 44 in the link layer 42 and other link layer protocols can also be used. (e.g., other IEEE 802.x protocols).

The link layer 42 also includes a Point-to-Point Protocol ("PPP") layer 45, hereinafter PPP 45. As is known in the art, PPP 45 is used to encapsulate higher level protocols to provide dial-up access over a serial communications link, and provide synchronous as well as asynchronous communications. For more information on PPP 45 see Internet Engineering Task Force ("IETF") Request for Comments ("RFC"), RFC-1661, RFC-1662 and RFC-1663, incorporated herein by reference.

Above the link layer 42 is a network layer 46 (also called the "Internet Layer" for Internet Protocol suites). The network layer 46 includes an IP layer 48. As is known in the art, IP 48 is an addressing protocol designed to route traffic within a network or between networks. IP layer 48, hereinafter IP 48, is described in IETF RFC-791, incorporated herein by reference. There is support for Mobile IP as described below is also included in the IP 48 layer.

The network layer 46 also includes an Internet Group Management Protocol ("IGMP") layer 50, an Internet Control Message Protocol ("ICMP") layer 52. IGMP layer 50, hereinafter IGMP 50, is responsible for multicasting. For more information on IGMP 50, see IETF RFC-1112, incorporated herein by reference. ICMP layer 52, hereinafter ICMP 52, is used for Internet Protocol control. The main functions of ICMP 52 include error reporting, reachability testing (e.g., "pinging"), route-change notification, performance, subnet addressing and other maintenance. For more information on ICMP 52 see IETF RFC-792, incorporated herein by reference. ICMP 52 can be used without IGMP 50 and both ICMP 52 and IGMP 50 are not required in protocol stack 40.

The network layer 46 may also include a Generic Routing Encapsulation ("GRE") layer (not illustrated). As is known in the art, GRE is protocol for performing encapsulation of an arbitrary network layer protocol over another arbitrary network layer protocol. For more information on GRE see IETF RFC-1701–1702, incorporated herein by reference.

Above network layer 46 is a transport layer 54. The transport layer 54 includes a Transmission Control Protocol ("TCP") layer 56 and/or a User Datagram Protocol ("UDP") layer 58.

The TCP layer 56, hereinafter TCP 56, provides a connection-oriented, end-to-end reliable protocol designed to fit into a layered hierarchy of protocols which support multi-network applications. TCP 56 provides for reliable inter-process communication between pairs of processes in network devices attached to distinct but interconnected networks. For more information on TCP 56 see IETF RFC-793, incorporated herein by reference.

The UDP layer 58, hereinafter UDP 58, provides a connectionless mode of communications with datagrams in an interconnected set of computer networks. UDP 58 provides a transaction oriented datagram protocol, where delivery and duplicate packet protection are not guaranteed. For more information on UDP 58 see IETF RFC-768, incorporated herein by reference. Both TCP 56 and UDP 58 are not required in protocol stack 40. Either TCP 56 or UDP 58 can be used without the other.

Above the transport layer 54 is an application layer 60 including application programs 62. The application programs 62 provide desired functionality to a network device (e.g., telephony or other communications functionality). For example, application programs 62 may provide voice, video, audio, data or other applications. The application layer 60 may also include application layer protocol layers. Application layer protocol layers typically provide a subset of the functionality provided by an application program.

In one embodiment of the present invention, the application layer 60 includes a Mobile IP application program 62 or application protocol layer. For more information on Mobile IP see "Mobile IP: The Internet Unplugged," by J. D. Solomon, Prentice-Hall, 1998, ISBN-O-13-856246-6. See also Mobile IP, as defined by IETF RFCs 2002–2006, all of which are incorporated herein by reference.

In one embodiment of the present invention, the application layer 60 includes a Dynamic Host Configuration Protocol ("DHCP") application program 62 or application protocol layer. DHCP is a protocol for passing configuration information such as IP 48 addresses to network devices on an IP 48 network and other networks. For more information on DHCP see, RFC-1541, and RFC-2131 and RFC-2132, incorporated herein by reference.

The application layer 60 may also include a Service Location Protocol ("SLP") application program 62 or application protocol layer. As is known in the art, SLP provides a scalable framework for the discovery and selection of network services. Using SLP, network devices using the Internet need little or no static configuration of network services for network based applications. For more information on SLP see IETF RFC-2608, incorporated herein by reference.

The application layer 60 may also include a Session Initiation Protocol ("SIP") application program 62 or application protocol layer. As is known in the art, the SIP is an application-layer 60 control (signaling) protocol for creating, modifying and terminating sessions with one or more participants. These sessions include Internet multimedia conferences, Internet telephone calls (e.g., Voice over IP, "VoIP") and multimedia distribution. Members in a session can communicate via multicast or via a mesh of unicast relations, or a combination of these. SIP invitations used to create sessions carry session descriptions, which allow participants to agree on a set of compatible media types.

SIP supports user mobility by proxying and re-directing requests to a mobile node's current location. Mobile nodes can register their current location. SIP is not tied to any particular conference control protocol. SIP is designed to be independent of a lower-layer transport protocol and can be extended. For more information on SIP, see IETF RFC-2543, "SIP: Session Initiation Protocol", the contents of which are incorporated by reference.

The application layer 60 may also include an ITU-T H.323 or H.324 application programs 62 or application protocol layers. As is known in the art, H.323 is the main family of video conferencing recommendations for Internet Protocol ("IP") networks. The ITU-T H.323 standard is incorporated herein by reference. As is known in the art, H.324 is a video conferencing recommendation using plain-old-telephone-service ("POTS") lines. The ITU-T H.324 standard is incorporated by reference.

The application layer 60 may also include a VoIP application program 62 or application protocol layer. VoIP typically comprises several application programs 62 (e.g., H.323, SIP, AAA, etc.) that convert a voice signal into a stream of packets (e.g., IP 48 packets) on a packet network and back again. VoIP allows voice signals to travel over a stream of packets.

VoIP services typically need to be able to connect to traditional circuit-switched voice networks. VoIP is typically used with the H.323 protocol and other multimedia protocols. H.323 terminals such as multimedia computers, hand-held devices, personal digital/data assistants ("PDA") or other devices such as mobile phones connect to existing wired and wireless PSTN as well as private wired and wireless networks.

H.323 terminals are typically LAN-based end points for voice transmission. H.323 terminals typically support real-time, two-way voice communications. H.323 terminals implement voice transmission functions and typically include at least one voice Compressor/Decompressor ("CO-DEC") that sends and receives packetized voice (e.g., ITU-T CODECS, G.711, G.723, G.726, G.728, G.729, etc.).

The application layer 60 may also include a Domain Name System ("DNS") application program 62 or application protocol layer. As is known in the art, the DNS provides replicated distributed secure hierarchical databases that hierarchically store resource records under domain names. For more information on the DNS see IETF RFC-1034, RFC-1035, RFC-1591, RFC-2606 and RFC-2929, the contents of all of which are incorporated by reference.

The application layer 60 may also include an Authentication Authorization and Accounting ("AAA") application program 62 or application protocol layer. As is known in the art, AAA includes a classification scheme and exchange format for accounting data records (e.g., for call billing, etc.). For more information on AAA applications, see, "Accounting Attributes and Record Formats," IETF RFC-2924, the contents of which are incorporated by reference.

Other examples, of AAA applications include, but are not limited to, "Remote Authentication Dial In User Service (RADIUS)" described in IETF RFC-2865, or the DIAMETER protocol, which is used for AAA for Mobile-IP, described in IETF draft <draft-calhoun-diameter-impl-guide-04.txt> entitled "DIAMETER Implementation Guidelines," July 2000, and IETF draft <draft-calhoun-diameter-mobileip-11.txt>, entitled "DIAMETER Mobile IP Extensions," September 2000, the contents of all of which are incorporated by reference. However, the present invention is not limited to these protocols or implementations, and other or equivalent AAA protocols can also be used.

The application layer 60 may also include a Simple Network Management Protocol ("SNMP") application program 62 or application protocol layer. SNMP is used to support network management functions. For more information on SNMP layer 62 see IETF RFC-1157, incorporated herein by reference.

In one embodiment of the present invention, one or more application programs 62 may be included in a network device, which also act as an application server. In another embodiment of the present invention, application programs 62 may be included in stand-alone application servers (e.g., SIP servers, H.323 servers, AAA servers, DNS servers, MBR-PR servers, VoIP servers, etc.). In such an embodiment, network devices may include only an application program layer (e.g., SIP) that communicates with an application program (e.g., SIP) running on the stand-alone application server to provide application functionality. However, the present invention is not limited to such embodiments, and other or equivalent embodiments could also be used.

Mobile IP

Mobile IP allows "mobile" nodes to transparently move between different IP sub-networks ("subnets"). Mobile IP allows a mobile node to dynamically change its network connectivity in a manner that is transparent to protocol layers above the network layer 46 (e.g., TCP 56 or UDP 58). In a preferred embodiment of the present invention, support for Mobile IP application programs 62 or Mobile IP application layers is included in the IP 48 layer (FIG. 2).

FIG. 3 is a block diagram illustrating an exemplary Mobile IP system 64. The Mobile IP system 64 includes one or more "non-mobile" network devices 66, 68, 70, 72, 74, 76, six of which are illustrated, and a mobile node 78, only one of which is illustrated. Hereinafter the mobile node 78 is called "mobile node 78." However, Mobile IP System 64 typically includes hundreds or thousands of mobile nodes. More or fewer non-mobile network devices or more mobile nodes can also be used. The non-mobile network devices 66, 68, 70, 72, 74, 76, and the mobile node 78 are assigned a network addresses such as IP 48 addresses on a Home Subnet ("HS") 80 as is illustrated in FIG. 3. The home subnet 80 includes but is not limited to, a wireless network, a wired LAN, an optical network or a cable network. However, other computer networks can also be used home subnet 80. The home subnet 80 is connected to an external network 82 such as the Internet or an intranet via a home agent ("HA") 76. The home agent 76 typically is a "gateway router" for the home subnet 80.

When mobile node 78 "roams" 84 away from its home subnet 80, it periodically transmits Mobile IP "agent solicitation" messages to foreign agents, such as foreign agent ("FA") 86 (i.e., foreign with respect to home subnet 80), via external network 82. The foreign agent 86 resides on a foreign subnet 88 with one or more foreign non-mobile network devices 90, 92, only two of which are illustrated. The foreign subnet 88 may also include one or more mobile nodes (not illustrated in FIG. 3). The foreign agent 86 is a gateway router for the foreign subnet 88. The foreign non-mobile network devices 90, 92 are assigned network addresses (e.g., IP 48 addresses) on the foreign subnet 88 as is illustrated in FIG. 3. (e.g., 12.0.0.x).

Roaming mobile node 78 listens for Mobile IP "agent advertisement" messages from foreign agents (i.e., foreign gateway routers such as foreign agent 86). When roaming mobile node 78 receives an agent advertisement message from a foreign agent indicating that it is now on a foreign subnet (e.g., foreign subnet 88), mobile node 78 registers with the foreign agent (e.g., foreign agent 86) and its home agent (e.g., home agent 76) indicating that the mobile node 78 has roamed 84 away from its home subnet 80.

As is illustrated in FIG. 3, the mobile node 78 has a network address (e.g., IP 48 address) of 11.0.0.4 on the home subnet 80. The home agent 76 has a network address of 11.0.0.7 on the home subnet 80. The mobile node 78 with network address 11.0.0.4, belongs to the home subnet 80 typically with network access prefix of 11.0.0 and a prefix length of 24 bits (i.e., 11.0.0.X/24). Network devices on the home subnet 80 have network addresses beginning with the network access prefix of 11.0.0 and a prefix length of 24 bits. Since the home agent 76 is advertising a route to the home subnet 80 at 11.0.0.X/24, it will accept data packets from external network 82 for network addresses with the network access prefix 11.0.0.X/24. For example, the home agent 76 accepts data packets for the mobile node 78 that has a home network address of 11.0.0.4, where X=4 since the network access prefix is equal to 11.0.0 with a length of 24-bits.

The foreign agent 86 has a network address of 12.0.0.4 on the foreign subnet 88. The foreign agent advertises a route to the foreign subnet 88 with network access prefix/prefix length of 12.0.0.Y/24. The foreign agent 86 will accept data packets that have a network address of 12.0.0.Y/24 on the foreign subnet 88. For example, the foreign agent will accept data packets for the non-mobile network devices 90,92 with a network address of 12.0.0.1, where Y=1, since the network access prefix is equal to 12.0.0 with a length of 24-bits.

The mobile node 78 uses its home network address of 11.0.0.4 on the home subnet 80 to register with the foreign agent 86 and the home agent 76. After registration of the mobile node 78, the foreign agent 86 will also accept data packets for the mobile node 78 at the specific home network address 11.0.0.4 for the mobile mode 78 as well as data packets that have a network prefix of 12.0.0/24. The foreign agent 86 also assigns a temporary foreign network address called a care-of-address ("COA") on the foreign subnet 88 to the mobile node 78 (e.g., 12.0.0.5).

Triangular Routing for a Mobile Node

Figure 4:
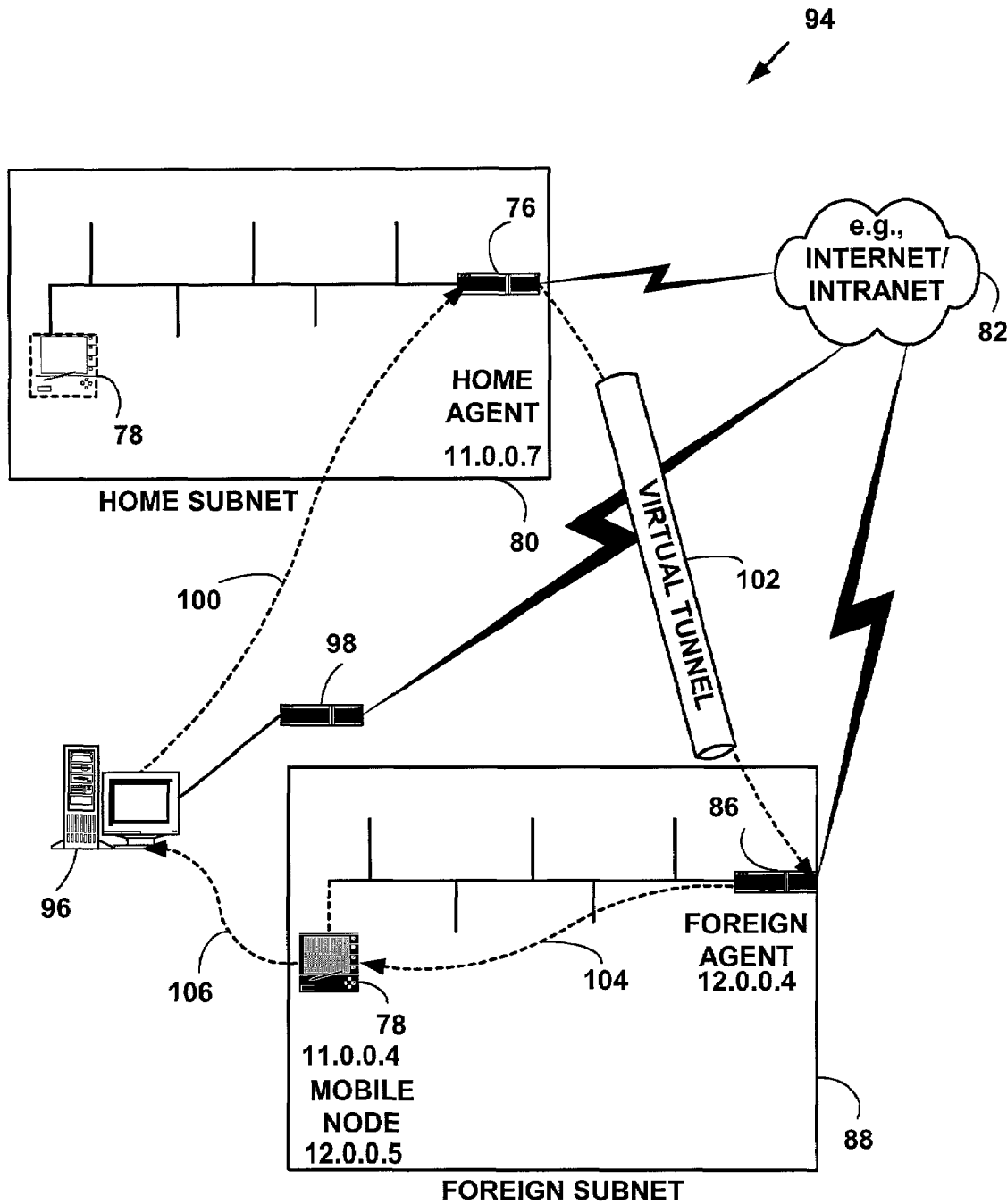
FIG. 4 is a block diagram illustrating triangular communications on an exemplary Mobile Internet Protocol system.

FIG. 4 is a block diagram illustrating exemplary Mobile IP communications in an exemplary Mobile IP system 94. Round-trip routing to and from the mobile node 78 is typically asymmetric and follows a triangular path. A "virtual" triangular routing path is illustrated in FIG. 4 with dashed lines. However, the actual routing path is accomplished between the home subnet 80 and the foreign subnet 88 using the solid line connections illustrated in FIG. 4 via external network 82.

As is illustrated in FIG. 4, a correspondent 96 with a router 98 receives data packets for the mobile node 78 from the external network 82. The correspondent 96 is, for example, a network access service provider being used by mobile node 78, or any other host device on the external network 82 (e.g., an edge router, telecommunications hub, etc.). In FIG. 4, the correspondent 96 sends data packets for the mobile node 78 to the mobile node's home agent 76. Dashed line 100 illustrates a "virtual" data flow pathway between the correspondent 96 and the home agent 76.

Assuming that the mobile node 78 has roamed 84 to the foreign subnet 88 and has registered its current location (e.g., on foreign subnet 88 and on the home subnet 80), the home agent 76 creates a "virtual tunnel" 102 to the foreign agent 86 via external network 82. As is known in the art, a virtual tunnel can be created by encapsulating a data packet inside another data packet by adding additional tunnel packet headers. In one preferred embodiment of the present invention, IP-in-IP tunneling is used. For more information on IP-in-IP tunneling see IETF RFC-1853, incorporated herein by reference. However, other virtual tunnels can also be created (e.g., UDP 58 tunneling or double IP-in-IP tunneling, GRE tunneling etc.). A reverse virtual tunnel 102 from a foreign agent 86 to home agent 76 eliminates triangular routing. When the foreign agent 86 receives tunneled packets, it removes the tunnel packet headers and routes 104 them to the mobile node 78, which is currently registered on the foreign network 86.

When the mobile node 78 sends packets to an external destination on external network 82, no tunneling is used. Data packets are transmitted 106 from mobile node 78 to the correspondent 96. Thus, a "virtual" routing triangle is formed as illustrated by the dashed lines in FIG. 4. The virtual routing triangle is a "logical" route rather than a "physical route." The physical route includes routes through external network 82. The correspondent 96 routes the data packets on to the external destination via the external network 82. Thus, the round-trip routing because of its asymmetric triangular path, introduces round-trip time ("RTT") delays for communications with the mobile node 78.

The mobile node 78, the home agent 76, and the foreign agent 86 typically maintain some Mobile IP state information. The mobile node 78 periodically transmits "keep-alive" messages using ICMP 52 messages, including standard ICMP 52 messages, and other ICMP 52 messages that are unique to Mobile IP. Mobile node 78 can roam to foreign subnets other than foreign subnet 88 and register with other foreign agents using Mobile IP.

Third Generation Mobile Architecture

Third-generation ("3G") architecture, supports, data rates ranging from about 144K bits-per-second to about 2M bits-per-second, ("bps") packet switched services including IP 48 traffic, symmetrical and asymmetrical data rates, multimedia services including video conferencing and streaming video, international roaming among different 3G operating environments. 3G includes packet-based transmission of digitized voice, data and video. 3G networks encompass a range of wireless technologies including Code Division Multiple Access ("CDMA"), Universal Mobile Telecommunications Service ("UMTS") Wide-band CDMA ("WCDMA") and others.

As is known in the art, CDMA is a digital communications technology that uses spread-spectrum communication techniques. CDMA does not assign a specific frequency to each user. Instead, every CDMA communications channel can use the full available communications spectrum. Individual conversations are encoded with a pseudo-random digital sequence.

As is known in the art, UMTS is a 3G mobile technology that delivers broadband information at speeds up to 2M bps. Besides voice and data UMTS delivers audio and video to wireless devices anywhere in the world through fixed, wireless and satellite systems.

The ITU-T guidelines for 3G networks are included in the IMT-2000 standard. The ITU-T IMT-2000 standard is incorporated herein by reference. See also, the TIA TSB115, Wireless IP Network Architecture standard, and TIA IS-835, Wireless IP Network Standard, and IS2000 and IS2001 standards for CDMA2000, the contents of all of which are incorporated by reference.

3G networks implementing IS2000 and IS2001 allow mobile nodes to roam from network-to-network using Mobile IP. Many of these mobile nodes will be wireless phones, wireless PDAs, or similar devices that need to establish, maintain and terminate call sessions. A call control protocol such as SIP, H.323, etc. is used for session control. These call control protocols allow a local proxy to be used on foreign networks so that local policy and/or bandwidth management can be applied to local and remote sessions. In the current generation of 3G networks, a local proxy is typically used on all foreign networks. A local proxy may be included in the foreign agent 86 or in a stand-alone local proxy server or application program on the foreign network 88.

Figure 5:
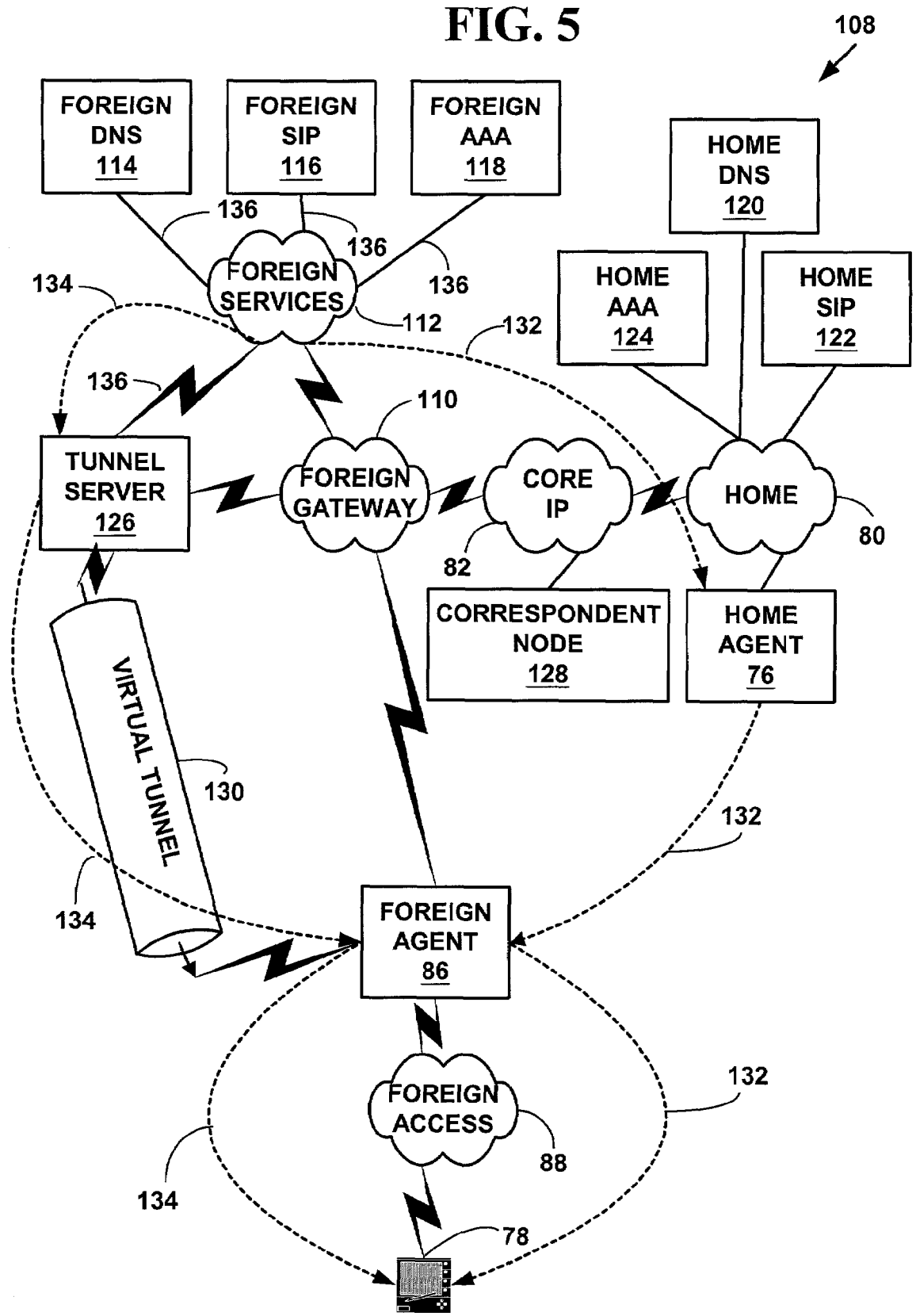
FIG. 5 is a block diagram illustrating an exemplary 3G system.

FIG. 5 is a block diagram illustrating an exemplary 3G system 108. The exemplary 3G system 108 includes a foreign gateway network 110, a foreign services network 112, a foreign DNS application 114, a foreign SIP application 116 and a foreign AAA application 118. The exemplary 3G system 108 also includes a home DNS application 120, a home SIP application 122, a home AAA application 124, a tunnel server ("TS") 126 and a correspondence node ("CN") 128. However, the present invention is not limited to such an embodiment and more fewer or other components can also be used in 3G system 108. In addition, components such as home DNS application 120, home SIP application 122, home AAA application 124, tunnel server 126 and correspondence node 128 are illustrated as separate components. In other embodiments, all or selected ones of these components may be combined into a single or smaller number of components (e.g., into home agent 76, etc.).

The foreign gateway network 110 and foreign services network 112 are illustrated as separate from foreign network 88. For example, the foreign gateway network 110 can include an IP 48 network or other network, the foreign services network 112 can include an IP 48 network, the Public Switched Telephone Network ("PSTN"), a packet data service node ("PDSN"), or other network or network device. In one embodiment of the present invention, the foreign agent 86 includes an associated PDSN. However, the present invention is not limited to this implementation and other types of foreign agents can also be used. However, the foreign gateway network 110 and the foreign services network 112 can also all be integral to foreign network 88.

A PDSN is a required component in most, but not all 3G networks 108. For mobile nodes 78, a PDSN is the point of entry into the wireless packet data network. The PDSN performs two basic functions: (1) it exchanges packets with a mobile node 78 over a wireless network; and (2) it exchanges packets with other IP 48 networks. The PDSN uses associated AAA servers for user authentication and traffic management, then forwards traffic to a gateway router/home agent (GR/HA) at the designated IP network.

In one embodiment of the present invention, the PDSN is implemented as using equipment from Commworks, a 3Com company (www.commworks.com). In one embodiment of the present invention, multiple PDSNs are deployed in a Commworks Total Control chassis. Up to 16 PDSNs can reside in a single Total Control communications hub chassis. With each PDSN supporting up to about 4,000 PPP 45 sessions, a fully loaded Total Control communications hub chassis can support up to about 64,000 PPP 45 sessions. An exemplary Total Control Communications Hub is described in U.S. Pat. No. 5,528,595, granted to Dale M. Walsh et al., and incorporated herein by reference.

However, the present invention is not limited to such an embodiment and the exemplary 3G system 108 could also be implemented using equipment from Cisco Systems of San Jose, Calif., Lucent Technologies of Murray Hill, N.J., Livingston Enterprises, Inc. of Pleasanton, Calif., and Ascend Communications of Alameda, Calif., Motorola, Inc. of Schaumburg, Ill., Nokia Corporation of Helsinki, Finland, Ericsson Corporation of Stockholm, Sweden, and others.

The PDSN is typically used with a Packet Control Function ("PCF"). As is known in the art, a PCF separates the IP 48 data transmissions and connects them to a core IP infrastructure 82. A PCF allows mobile VoIP and IP multimedia calls to continue through the core IP network 82.

In one embodiment of the present invention, the foreign gateway network 110 and the foreign services network 112 are integral to foreign network 88. In another embodiment of the present invention, the foreign network 88, foreign gateway network 110 and foreign services network 112 are separate networks. However, in such an embodiment, the separate foreign networks are collectively referred to as "foreign network 88" for the sake of simplicity.

The exemplary 3G system 108 includes a virtual tunnel 130, a default communications path 132 a new communications path 134, and a tunnel server communications path 136. The default communications path 132 includes a communications path from the foreign services applications 114, 116, 118 on a foreign network, to the home agent 76 on the home network 80, to the foreign agent 86 on the foreign network 88 and to the mobile node 78 on the foreign network 88. The new communications path 134 includes a communications path from the foreign services applications 114, 116, 118, to the tunnel server 126 on a foreign network, to the foreign agent 86, and to the mobile node 78 on the foreign network 88. The tunnel server communications path 136 includes a communications path or a reverse communications between the foreign service applications 114, 116, 118 and the tunnel server 126.

The exemplary 3G system 108 also includes the home agent 76, mobile node 78, home network 80, external network 82, foreign agent 86 and foreign network 88 as described above (FIG. 3). The home network 80 and the foreign network components include, but are not limited to, a wireless network, a LAN, an optical network or a cable network. However, other equivalent high-speed computer networks can also be used. However, the present invention is not limited to the exemplary 3G system illustrated, and more, fewer or equivalent components can also be used.

In one embodiment of the present invention, the exemplary 3G system 108 includes an all IP 48 network comprising of an IP 48 radio access network ("IP-RAN"), a PDSN, a PCF and an IP Mobility Core Network 82. However, the present invention is not limited to such an embodiment and other embodiments with more or fewer components can also be used.

Such an exemplary network supports 2G, 2.5G and 3G wireless interface technologies including, but not limited to, Global System for Mobile Communications, ("GSM"), Generic Packet Radio Services ("GPRS"), Personal Communications Services ("PCS"), a Cellular Digital Packet Data ("CDPD"), Wireless Application Protocol ("WAP"), Digital Audio Broadcasting ("DAB"), Bluetooth, 802.11a, Wireless LAN, Wifi/802.11b, or other types of wireless network interfaces.

As is known in the art, GSM is another type of digital wireless technology widely used throughout Europe, in Australia, India, Africa, Asia, and the Middle East. GSM is currently not widely used in the United States, but its use is growing. GSM is a wireless platform based on Time Division Multiple Access ("TDMA") to digitize data. GSM includes not only telephony and Short Message Services ("SMS") but also voice mail, call forwarding, fax, caller ID, Internet access, and e-mail.

As is known in the art, TDMA is a communication technology for delivering digital wireless service using time-division multiplexing. TDMA works by dividing a radio frequency into time slots and then allocating slots to multiple calls. Thus, a single frequency can support multiple, simultaneous data channels. SMS is type of communications service for private message communications with another user.

GSM typically operates at three frequency ranges: 900 MHz (GSM 900) in Europe, Asia and most of the rest of the world; 1800 MHz (GSM 1800 or DCS 1800 or DCS) in a few European countries; and 1900 MHz (GSM 1900 also called PCS 1900 or PCS) in the United States. GSM also operates in a dual-band mode including 900/1800 Mhz and a tri-band mode include 900/1800/1900 Mhz.

As is known in the art, PCS networks include network that cover a range of wireless, digital communications technologies and services, including cordless phones, mobile phones, voice mail, paging, faxing, mobile personal digital/data assistants (PDAs), etc. PCS devices are typically divided into narrowband and broadband categories.

Narrowband devices, that operating in the 900 MHz band of frequencies, typically provide paging, data messaging, faxing, and one- and two-way electronic messaging capabilities. Broadband devices, which operate in the 1850 MHz to 1990 MHz range typically provide two-way voice, data, and video communications. Other wireless technologies such as GSM, CDMA and TDMA are typically included in the PCS category.

As is known in the art, GPRS is a standard for wireless communications, which runs at speeds up to 150 kilo-bits-per-second ("kbit/s"). GPRS, which supports a wide range of bandwidths is an efficient use of limited bandwidth and is particularly suited for sending and receiving small bursts of data such as e-mail and Web browsing, as well as large volumes of data.

As is known in the art, CDPD is a wireless standard providing two-way, 19.2-Kbps or higher packet data transmission over existing cellular telephone channels. As is known in the art, a Packet Cellular Network ("PCN") includes various types of packetized cellular data.

As is known in the art, an 802.11b is a short-range wireless network. The IEEE 802.11b standard defines wireless interfaces that provide up to 11 Mbps wireless data transmission to and from wireless devices over short ranges in the 2.4 GHz band.

As is known in the art, 802.11a is an extension to 802.11 that applies to wireless LANs and provides up to 54 Mbps in the 5 GHz band. 802.11a uses an orthogonal frequency division multiplexing encoding scheme. 802.11a is being developed after release of 802.11b.

As is known in the art, Bluetooth is a short-range (e.g., about 10 meters) radio frequency technology aimed at simplifying communications among network devices and between network devices. Bluetooth wireless technology supports both short-range point-to-point and point-to-multipoint connections.

As is known in the art, DAB is compact disk ("CD") quality audio also known as MUSICAM including ISO/IEC 11172-3 (MPEG-1 Audio Layer II) and ISO/IEC 13818-3 (MPEG-2 Audio Layer II). DAB supports mono, stereo and dual-channel bilingual programs. It supports different encoded bit-rate options including 8, 16, 24, 32, 40, 48, 56, 64, 80, 96, 112, 128, 144, 160 or 192 kbit/s per channel.

DAB allows Program Associated Data ("PAD") with a variable capacity of a minimum of 667 bits-per-second ("bps") up to 65 kbits/s. DAB can be used for independent data service channels in the form of a continuous stream segmented into 24 milli-second ("ms") logical frames with a data rate of N×8 kbits/s (N×32 kbits/s for some code rates). Typical DAB data services include a traffic message channel, correction data for Digital GPS ("DGPS"), paging and electronic newspaper features. A DAB system may be used to suggest routes to drivers.

In one embodiment of the present invention, the exemplary 3G system 108 is implemented as using equipment from Commworks. For example, the exemplary 3G system 108 can be implemented using a Commworks 3G Data System including a Total Control Communications Hub by 3Com Corporation of Santa Clara, Calif. including a Commworks Total Control 1000 Packet Data Serving Node Card Set, a Steel-Belted RADIUS Advanced Wireless Edition AAA Server, Signaling Control Nodes, Total Control 1000 Home Agent Card set including dual Home Agent Control Nodes, a Commworks 5310 3G Data Systems Manager and CommWorks 4302 Foreign Agent Control Nodes. As was described above and exemplary Total Control Communications Hub is described in U.S. Pat. No. 5,528,595.

However, the present invention is not limited to CommWorks foreign agent card sets and other types of foreign agents 86 or foreign agent card sets can also be used, such as those by Cisco, Lucent, Livingston, Ascend, Motorola, Nokia, Ericsson and others.

FIG. 5 illustrates only one foreign agent 86. However, in most implementations plural foreign agents 86 are used since large numbers of mobile nodes are supported.

Foreign Agents ("FA")

Figure 6:
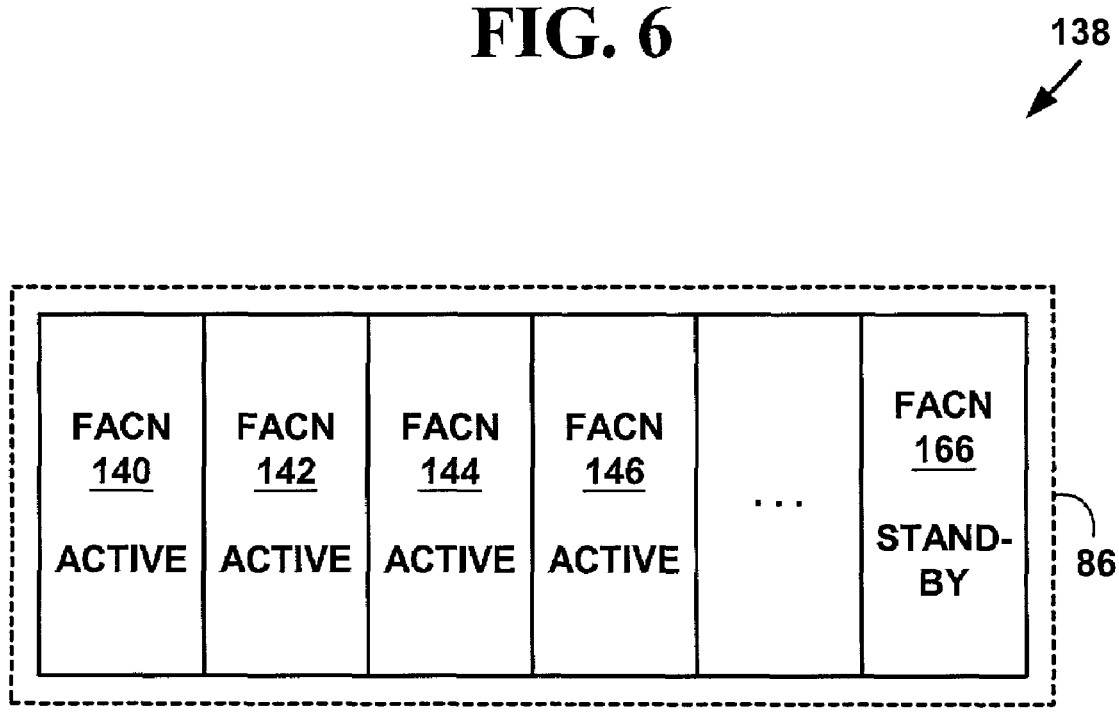
FIG. 6 is a block diagram illustrating an exemplary foreign agent with plural foreign agent cards and plural foreign agent control node cards.

FIG. 6 is a block diagram illustrating a multiple component exemplary foreign agent 138 with plural foreign agent control nodes used with foreign agent 86. Foreign agent 138 includes plural foreign agent control node cards 140–166 in a foreign agent card chassis. The plural foreign agent control node cards include plural active foreign agent control node cards 140–164 and at least one backup foreign agent control node card 166. However, the present invention is not limited to such an embodiment for the foreign agent 86, and other embodiments can also be used.

In one embodiment of the present invention, a CommWorks PDSN card set is used for foreign agent 138. However, the present invention is not limited to CommWorks PDSN card sets and other types of foreign agents 86 or foreign agent card sets can also be used, such as those by Cisco, Lucent, Livingston, Ascend, Motorola, Nokia, Ericsson and others.

Foreign Agent Control Node ("FACN")

Within the 3G network 108, the FACN is a signaling control node that enables advanced Mobile IP signaling applications. The FACN provides a control mechanism for managing multiple PDSNs, allowing wireless service providers to deploy a highly distributed architecture that is scalable and robust.

The FACN allows creation of a virtual PDSN environment that helps eliminate address mapping between static radio nodes and PDSN IP 48 addresses. The FACN helps ensures efficient use of PDSNs within the 3G network 108 by providing PDSN redundancy, optimal PDSN selection, and PDSN load balancing.

Mobile Node Signaling in a 3G Network

Figure 7:
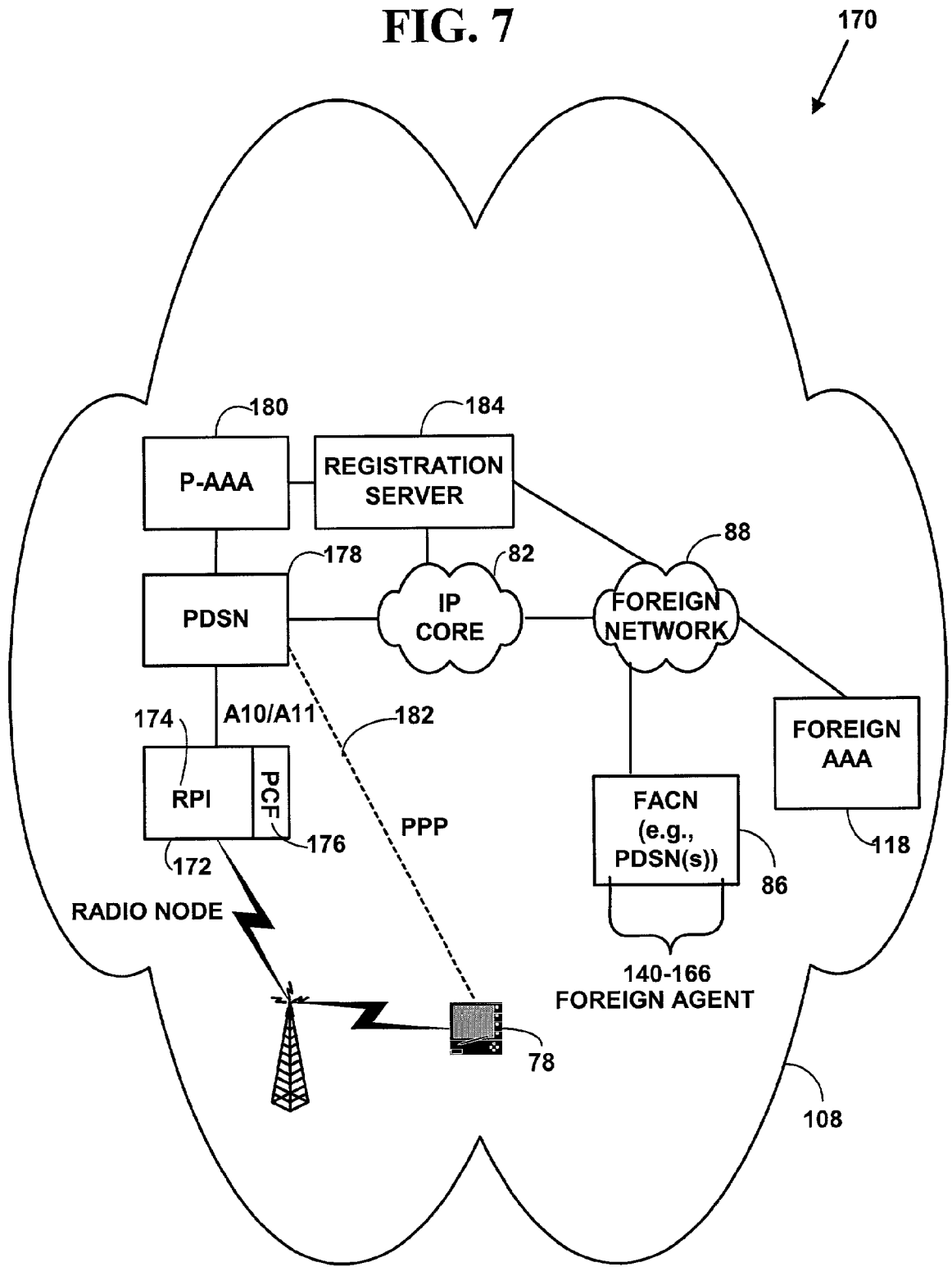
FIG. 7 is a block diagram illustrating a exemplary portion of a 3G system for mobile node signaling.

FIG. 7 is a block diagram illustrating a exemplary portion 170 of the 3G system 108 for mobile node signaling. The portion 170 includes a wireless mobile node 78, a radio node ("RN") 172 with PCF 174 and a radio packet interface ("RPI") 176, a PDSN 178 and a P-AAA server 180. The RPI 176 is a link between wireless radio access and packet data network equipment. The PDSN 178 is in communications with the IP core network 82. The IP core network 82 is in communications with the foreign network 88 with the FA 86 comprising multiple FACN 144–166. The FA 86 is in communications with the foreign AAA server 118.

The RPI 176 defines two logical channels: an A10 channel for data and A11 channel for signaling. A11 signaling is based on Mobile IP messages including Registration Request ("RRQ") and Registration Reply ("RRP"), Registration Update ("RUP") and Registration Acknowledge ("RACK"). Data from the wireless mobile node 78 is typically encapsulated in GRE packets and tunneled from the PCF 174 to the PDSN 178 over an all channel, where it is de-capsulated and further processed. The P-AAA server 180 includes wireless mobile node 78 packet-data-provisioning information and is used to authenticate and determinate the parameters of a wireless mobile node's 78 packet-data session. The wireless mobile node 78 typically establishes a PPP 45 data link 182 that terminates at the PDSN 178 as is explained below. The PPP 45 data link 182 is used to help provide a point-to-point data-link keeper for higher-level application services 62 such as VoIP, H.323, etc.

A registration server 184 is also in communications with the PDSN 178 and the FACN 140. Optionally, a pre-paid mobile service provider is able to configure an IP 48 address used for the registration server 184. The registration server 184 is responsible for informing the wireless mobile node 78 that its pre-paid mobile services have expired, allows the wireless mobile node 78 to purchase additional time or bytes or packets, etc. immediately, and responsible for pre-paid billing and accounting activities. The registration server 184 sends extensible Markup Language ("XML") messages to Wireless Application Protocol ("WAP") capable wireless mobile nodes 78, as well as Hyper Text Markup Language ("HTML") messages to other types of wireless mobile nodes 78 or relay-mode laptops that are capable of standard web access.

Handoff Support for Wireless Mobile Nodes Using Pre-Paid Mobile Services

Figure 8:
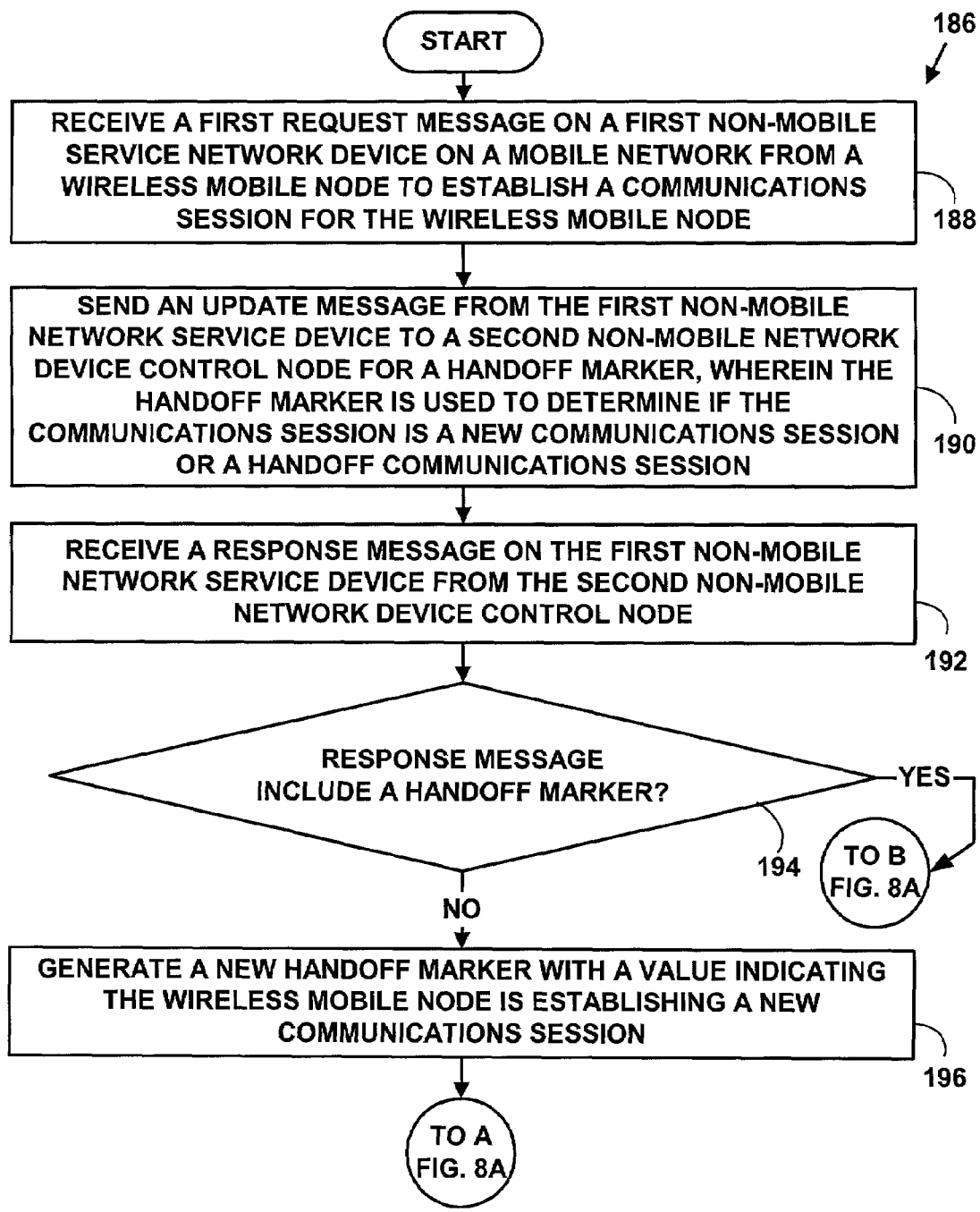
FIGS. 8A and 8B are flow diagram illustrating a method for allowing handoffs for pre-paid mobile services for wireless mobile nodes.

FIGS. 8A and 8B are flow diagram illustrating a Method 186 for allowing handoffs for wireless mobile nodes using pre-paid mobile services. In FIG. 8A at Step 188, a first request message is received on a first non-mobile service network device on a mobile network from a wireless mobile node to establish a communications session for the wireless mobile node. At Step 190, an update message is sent from the first non-mobile service network device to a second non-mobile network device control node to request a handoff marker. The handoff marker is used to determine if the communications session to be established is a new communications session or a handoff communications session. At Step 192, a response message is received on the first non-mobile service network device from the second non-mobile network device control node. The response message includes account information for pre-paid mobile services purchased for the wireless mobile node and may or may not include a handoff marker.

At Step 194, a test is conducted on the first non-mobile service network device to determine whether the response message includes a handoff marker. If the response message does not include a handoff marker, at Step 196, a new handoff marker is generated with a value indicating the wireless mobile node is establishing a new communications session. At Step 198, the generated handoff marker is sent to the second non-mobile network device control node in an update message wherein the second non-mobile network device uses the generated handoff marker in subsequent messages sent to the first non-mobile network service device to allow handoff and redirection of communications sessions established by the wireless mobile node.

At FIG. 8B at Step 200, the generated handoff marker is sent to an authentication authorization and accounting server in an access request message to allow the authentication authorization and accounting server to differentiate between the establishment of a new communications session and a handoff of an existing communications session to another non-mobile service network device.

At Step 202, the first non-mobile service network device receives an access response message from the authentication authorization and accounting server. The access response message includes account information for any pre-paid mobile services purchased for the wireless mobile node and will be used by the first non-mobile service network device to provide pre-paid billing services for the wireless mobile node.

If the response message does include a handoff marker during the test at Step 194, at Step 204 the value of the handoff marker is changed to create a modified handoff marker with a new value to indicate the wireless mobile node is undergoing a hard handoff of an existing communications session to another non-mobile service network device. At Step 206, the modified handoff marker is sent to the authentication authorization and accounting server in an access request message to allow the authentication authorization and accounting server to differentiate between the establishment of a new communications session and the handoff of an existing communications session to another non-mobile service network device.

Method 186 is illustrated with an exemplary embodiment. However, the present invention is not limited to this embodiment and other embodiments with other components can also be used to practice the invention illustrated with Method 186.

In such an exemplary embodiment, account information for pre-paid mobile services purchased for a Mobile IP wireless mobile node 78 is stored in a pre-paid mobile user profile on a P-AAA server 180 associated with a 3G network 108. The P-AAA server 180 is illustrated herein as associated with the PDSN 178. However, the present invention is not limited to such an embodiment, and virtually any AAA server on the 3G network 108 can also be used to practice the present invention.

In one embodiment of the present invention, account information for pre-paid mobile services is based on individual or combinations of the services listed in Table 1 below. However, the present invention is not limited to such an embodiment, and more, fewer or other pre-paid mobile services can also be used.

At Step 188, a PPP 45 request message is received on an A11 channel on a PDSN 178 on a 3G network 108 from a wireless mobile node 78 trying to establish a PPP 45 communications session 182 for the wireless mobile node 78.

At Step 190, a Mobile IP registration update message is sent over an A11 channel from the PDSN 178 to a FACN (e.g., 140) to request a handoff marker. The handoff marker is used to determine if the communications session is a new communications session or a handoff communications session.

In one embodiment of the present invention, the handoff marker is a digital cookie. However, the present invention is not limited to such an embodiment, and other types of handoff identifiers can also be used. As is known in the art, a "digital cookie" is a block of data that uniquely identifies a client device and includes other relevant information. A digital cookie is typically generated by a server device and returned to a client device in response to a request from the client device.

At Step 192, a Mobile IP registration acknowledgement message is received on an A11 channel on the PDSN 178 from the FACN 140. At Step 194, a test is conducted on PDSN 178 to determine whether the Mobile IP registration acknowledgement message includes a handoff marker.

If the Mobile IP registration acknowledgement message does not include a handoff marker, at Step 196, a new handoff marker is generated with a value indicating the wireless mobile node 78 is establishing a new communications session.

In one embodiment of the present invention, the PDSN 178 generates a digital cookie including a 32, 64, 128-bit, etc. or larger random number. The PDSN 178 sets the Most Significant Byte ("MSB") of the digital cookie to zero to indicate to the P-AAA server 180 that wireless mobile node 78 is establishing a new communications session. However, the present invention is not limited to such an embodiment and other types of digital cookies and/or handoff markers can also be used. In addition other types of actions can also be applied to the digital cookies or handoff markers generated and the present invention is not limited to manipulating the MSB.

At Step 198, the generated handoff marker is sent to the P-AAA server 180 in an access request message to allow the P-AAA server 180 to differentiate between the establishment of a new communications session and a hard handoff of an existing communications session to another PDSN. The P-AAA server 180 with a pre-paid billing system uses the handoff marker to differentiate between new and handoff communications sessions for wireless mobile nodes 78.

At Step 200, the P-AAA server 180 returns an access response message. The access response message includes account information for any pre-paid mobile services purchased for the wireless mobile node 78. The account information is stored in a pre-paid mobile user profile on the P-AAA server 180.

In one embodiment of the present invention, account information for pre-paid mobile services is based individual or combinations of the services listed in Table 1. However, the present invention is not limited to such an embodiment, and more, fewer or other pre-paid mobile services can also be used.

TABLE 1

Time: Subscribers can purchase a specific amount of transmit and/or receive time during which they can use wireless data services. Note that since 3G services can be always on, only time spent in active state shall be counted towards usage. Time spent in dormant state shall not be counted against the pre-paid usage.

Bytes Received: Subscribers can purchase a package (as determined by the carrier) that entitles them to access wireless data services and receive a specific number of data bytes received.

Bytes Transmitted: Subscribers can purchase a package (as determined by the carrier) that entitles them to access wireless data services and transmit a specific number of data bytes transmitted.

TABLE 1-continued

Packets Received: Subscribers can purchase a package (as determined by the carrier) that entitles them to access wireless data services and receive a specific number of data pacekts received.
Packets Transmitted: Subscribers can purchase a package (as determined by the carrier) that entitles them to access wireless data services and transmit a specific number of data packets transmitted.

In FIG. 8B at Step 202, the generated handoff marker is sent from the PDSN 178 to FACN 140 in a Mobile IP registration update message on an A11 channel. The FACN 140 will store the handoff marker along with a present call state. The FACN 140 will include the handoff marker (if one is present) in all messages sent to the PDSN 178 to allow handoffs and re-direction of communication sessions for wirelesss mobile nodes 78. In another embodiment of the present invention, the handoff marker can also be stored on and sent to and from in a HA 76.

If the a Mobile IP registration acknowledgement message does include a handoff marker during the test at Step 194, at Step 204 the value of the handoff marker is changed to create a modified handoff marker to indicate the wireless mobile node 78 is undergoing a handoff of an existing communications session to a new PDSN.

In one embodiment of the present invention, the existing digital cookie value is changed by setting the MSB to one (if it is not already set to one). However, the present invention is not limited to such an embodiment and the digital cookie and/or handoff marker can be modified with other actions. A digital cookie with a MSB set to one indicates the communications session is a handoff session and not a new session.

At Step 206, the modified handoff marker is sent to the P-AAA server 180 to allow the P-AAA server 180 to differentiate between the establishment of a new communications session and the handoff of an existing communications session to another PDSN. The P-AAA server 180 stores the modified handoff marker for subsequent use.

Pre-Paid Mobile Services Handoff Message Flow

Figure 9:
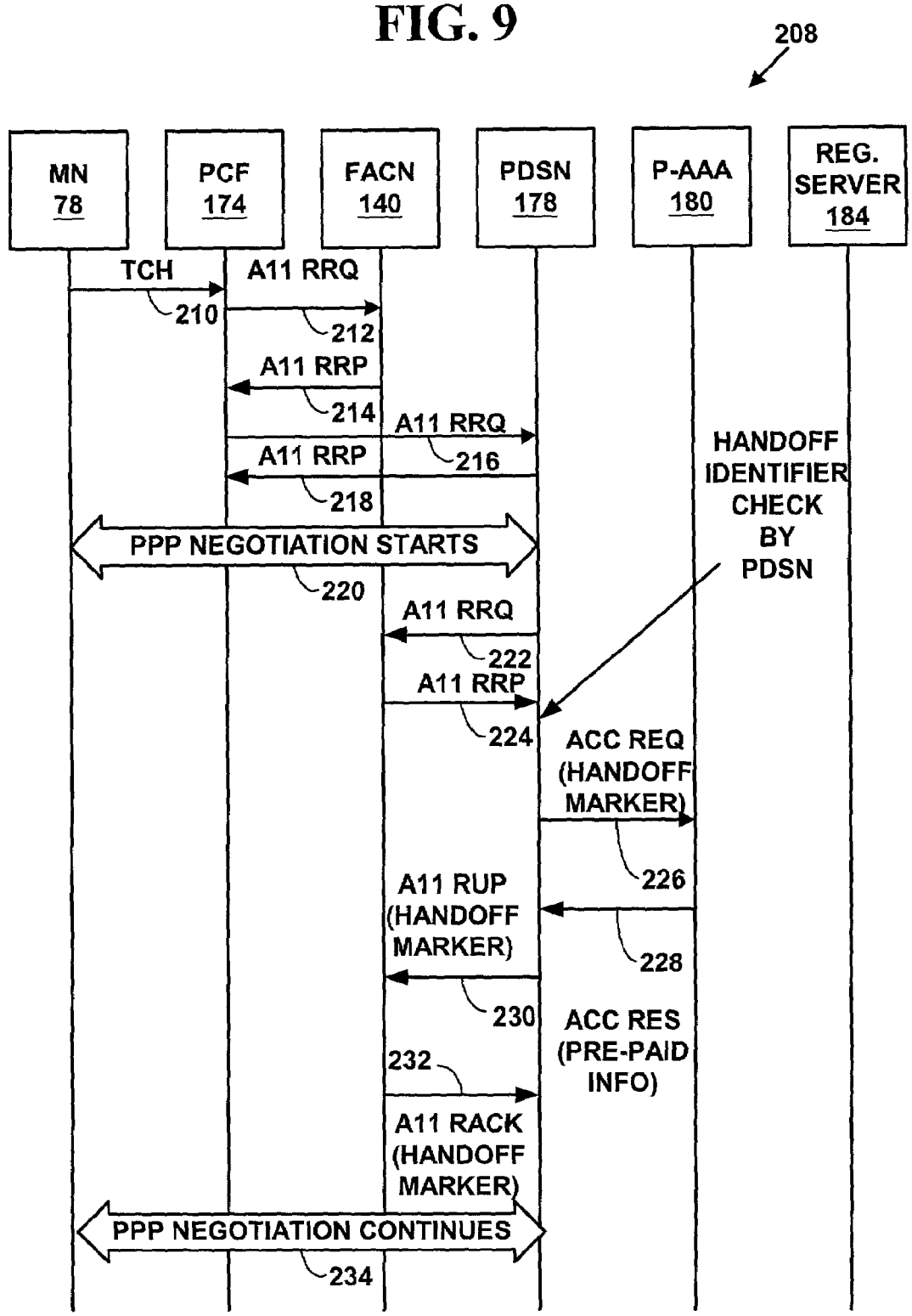
FIG. 9 is a block diagram illustrating an exemplary message flow for providing pre-paid mobile services for wireless mobile nodes with handoff and re-direction.

FIG. 9 is a block diagram illustrating exemplary message flow 208 for providing pre-paid mobile services for wireless mobile nodes with handoff and re-direction. Wireless mobile node 78 has roamed from the home network 80 to a new foreign network 88. Wireless mobile node 78 initiates a communications session by sending a Traffic CHannel ("TCH") setup message 210 to the PCF 174. The PCF 174 sends a Mobile IP registration request 212 to on an A11 channel to FACN 140 to request registration of the wireless mobile node 78 on the foreign network 88. The FACN 140 responds with a Mobile IP registration response message 214 on an A11 channel. The PCF 174 sends a Mobile IP registration request 216 on an A11 channel to the PDSN 178. The PDSN 178 returns a Mobile IP registration response message 218 on an A11 channel to the PCF 174.

The wireless mobile node 78 begins PPP 45 negotiations 220 with the PDSN 178 to establish a PPP 45 session 182 (Step 188). The PDSN 178 sends a Mobile IP registration request message 222 for the PPP 45 session 182 over an A11 channel to the FACN 140 (Step 190). The FACN 140 responds with a Mobile IP registration reply message 224 (Step 192) that may or may not include a handoff marker.

The PDSN 178 determines if a handoff marker is included in the Mobile IP registration update message 224 and may generate a new handoff marker if necessary (Steps 196, 198).

The PDSN 178 sends an access request message 226 including the handoff marker to the P-AAA 180 (Step 198).

The access request message 226 is also used to retrieve any information about the pre-paid mobile services the wireless mobile node 78 may have already pre-paid for. Account information for pre-paid mobile services purchased for the wireless mobile node 78 is stored in a pre-paid mobile user profile on a P-AAA server 180.

An access response message 228 sent from P-AAA server 180 is received on the PDSN 178 (Step 200). The accounting access response message includes account information from the pre-paid mobile user profile.

The received or generated handoff marker is sent from the PDSN 178 to FACN 140 in a Mobile IP registration update message 230 on an A11 channel (Step 200). The FACN 140 will store the handoff marker along with a present call state. The FACN 140 will include the handoff marker (if one is present) in all messages sent to the PDSN 178. The HA 76 may also be used to store the handoff marker instead of the FACN 140. The FACN 140 sends a Mobile IP registration acknowledgement message 232 on an A11 channel back to the PDSN 178 including the handoff marker. The PPP 45 session 182 negotiation continues 234 until it is established.

AAA Server Support for Wireless Mobile Node Handoffs and Re-Direction

Figure 10A:
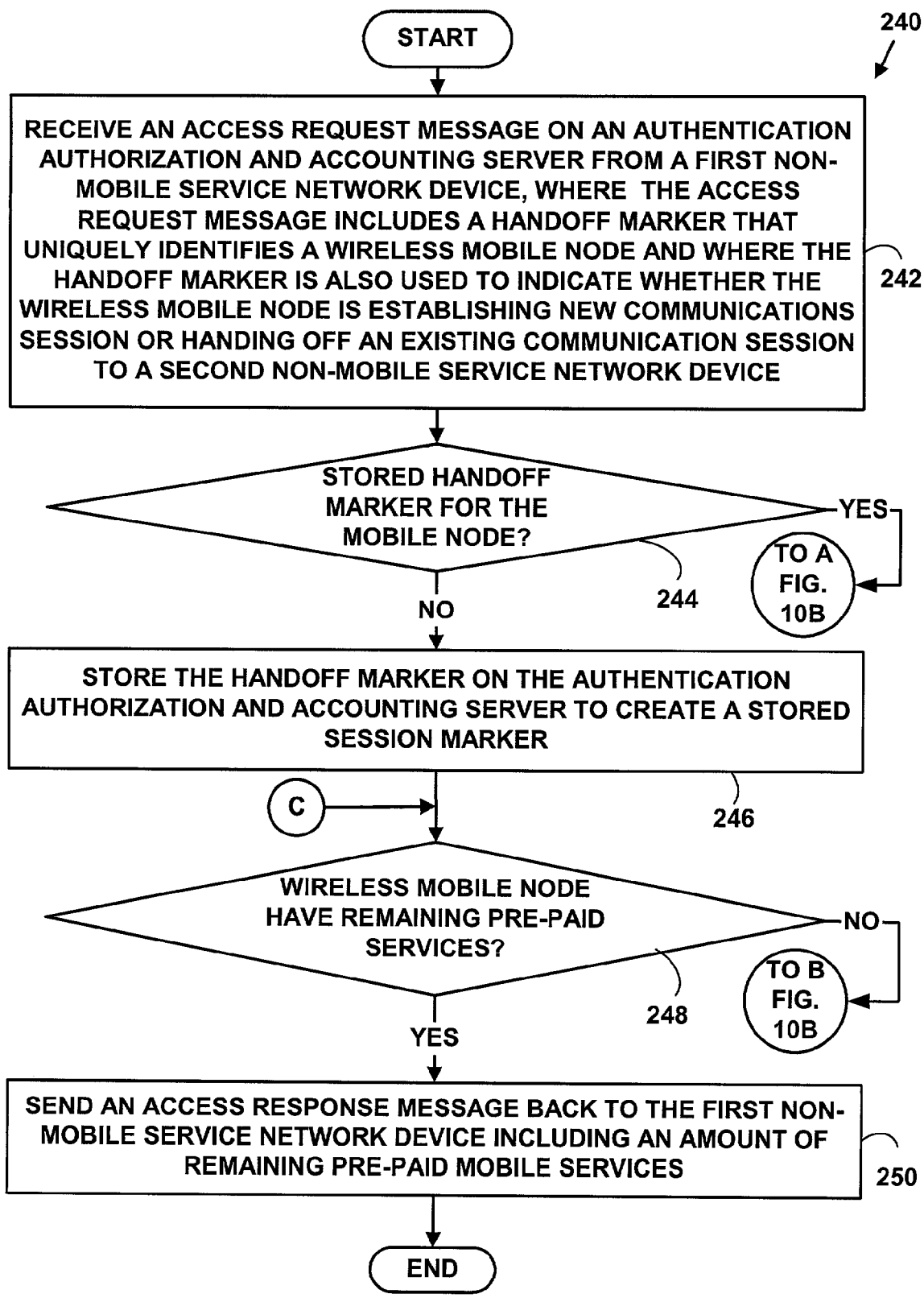
FIGS. 10A and 10B are a flow diagram illustrating a method for processing handoff requests for wireless mobile nodes using pre-paid mobile services.
Figure 10B:
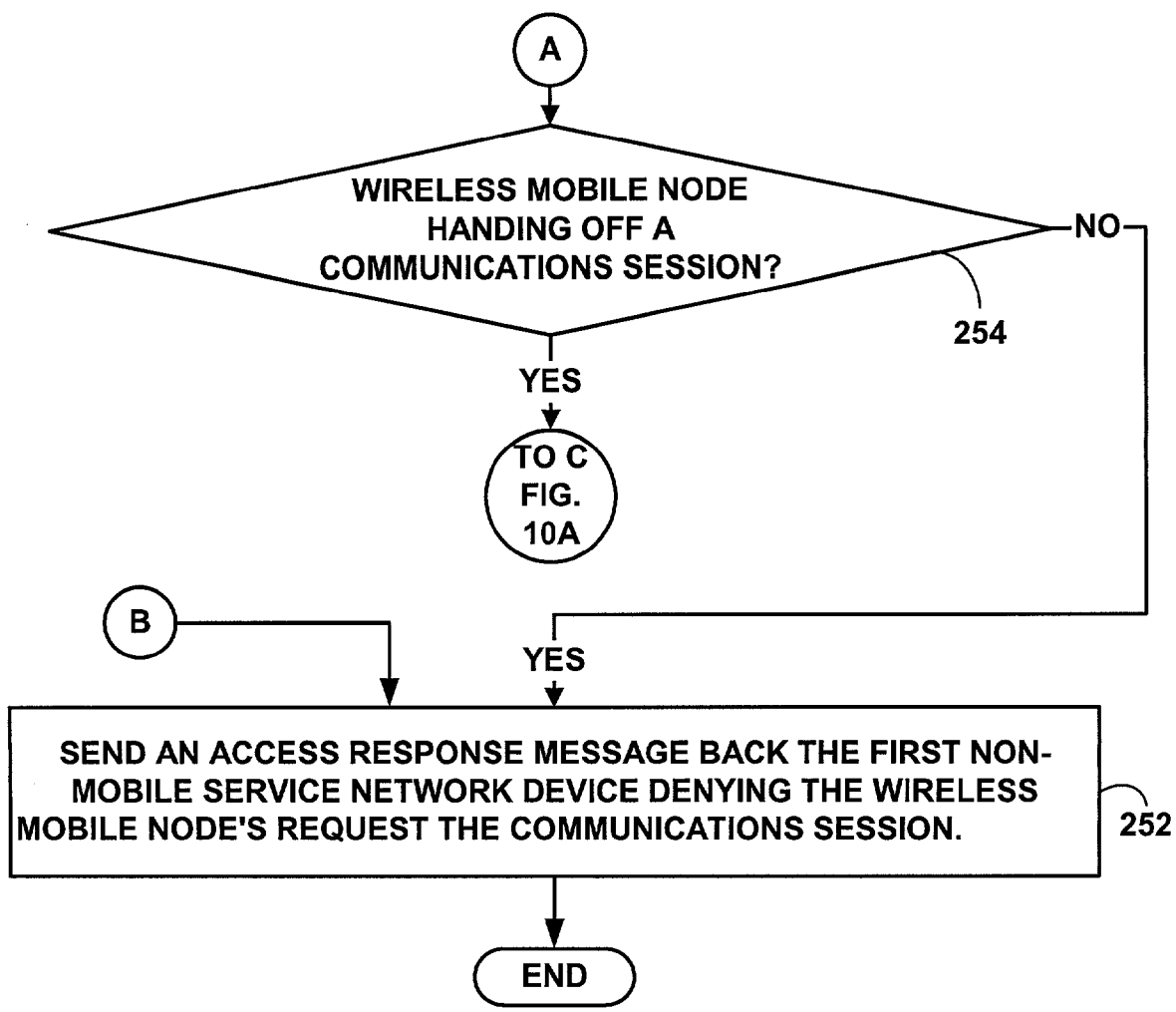

FIGS. 10A and 10B are a flow diagram illustrating a Method 240 for processing handoff requests for wireless mobile nodes using pre-paid mobile services. In FIG. 10A at Step 242, an access request message is received on an authentication authorization and accounting server from a first non-mobile service network device. The access request message includes a handoff marker that uniquely identifies a wireless mobile node. The handoff marker is used to indicate whether a wireless mobile node is requesting establishment of a new communications session with the first non-mobile service network device or handing off an existing communication session to another non-mobile service network device.

At Step 244, a test is conducted to determine the determining whether the authentication authorization and accounting server already has a stored handoff marker for the wireless mobile node. If the authentication authorization and accounting server does not have a stored handoff marker for the wireless mobile node, at Step 246 the handoff marker is stored on the authentication authorization and accounting server thereby creating a stored handoff marker. If the authentication authorization and accounting server does not have a stored handoff marker, the wireless mobile node is establishing a new communications session with the first non-mobile server network device. In another embodiment of the present invention, the test at Step 244 includes determining with the handoff marker value whether the wireless mobile node is establishing a new communications session.

At Step 248, a test is conducted to determine whether the wireless mobile node has remaining pre-paid mobile services. If the wireless mobile node has remaining pre-paid mobile services, at Step 250 the authentication authorization and accounting server sends an access response message back to the first non-mobile service network device including an amount of remaining pre-paid mobile services.

If the wireless mobile node does not have remaining pre-paid mobile services, in FIG. 10B at Step 252, the authentication authorization and accounting server sends an access response message back the first non-mobile service network device denying the wireless mobile node's request to establish the communications session since the mobile node does not have any remaining pre-paid mobile services.

If at Step 244 the authentication authorization and accounting server does have a stored handoff marker for the wireless mobile node, the wireless mobile node already has an established communication session. In FIG. 10B at Step 254, a test is conducted using a handoff marker value to determine whether the wireless mobile node is requesting to handoff a communications session to another non-mobile service network device. If at Step 254, the wireless mobile node is requesting to handoff a communications session to another non-mobile service network device, Step 248 in FIG. 10A is executed as described above to determine if the wireless mobile node has remaining pre-paid mobile services.

If at Step 254, the wireless mobile node is not requesting to handoff a communications session to another non-mobile service network device, Step 252 is executed denying the access request since the wireless mobile node is trying to establish a second new communications session with the first non-mobile service network device, which is not allowed.

Method 240 is illustrated with an exemplary embodiment. However, the present invention is not limited to this embodiment and other embodiments with other components can also be used to practice the invention illustrated with Method 240.

In such an exemplary embodiment at FIG. 10A at Step 242, an access request message is received on P-AAA server 180 from the PDSN 178 (e.g., at Step 198 of Method 186). The access request message includes a handoff marker such as a digital cookie that uniquely identifies a wireless mobile node 78. The digital cookie is also used to indicate whether the wireless mobile node 78 is establishing new communications session or handing off an existing communication session to another PDSN. (e.g., MSB=zero=new, MSB=one=handoff).

At Step 244, a test is conducted to determine whether the P-AAA server 180 already has a stored digital cookie for the wireless mobile node 78. If P-AAA server 180 does not have a stored digital cookie for the wireless mobile node 78, at Step 246 the digital cookie is stored on the P-AAA server 180 thereby creating a stored digital cookie. If the P-AAA server 180 does not have a stored digital cookie for the wireless mobile node 78, the wireless mobile node 78 is establishing a new PPP 45 communications session.

At Step 248, a test is conducted to determine whether the wireless mobile node 78 has remaining pre-paid mobile services. If the wireless mobile node 78 has remaining pre-paid mobile services, at Step 250 the P-AAA server 180 sends an access response message back to the PDSN 178 including an amount of remaining pre-paid mobile services (e.g., received at Step 200 of Method 186 by the PDSN 178). If the wireless mobile node 78 does not have remaining pre-paid mobile services, in FIG. 10B at Step 252, the P-AAA server 170 sends an access response message back the PDSN 178 denying the wireless mobile node's 78 request to establish a new communications session.

If at Step 244 the P-AAA server 180 does have a stored digital cookie for the wireless mobile node 78, the wireless mobile node 78 already has an established PPP 45 communication session with the PDSN 178. The wireless mobile node 78 cannot establish a second new communications session to the same PSDN 178.

In FIG. 10B at Step 254, a test is conducted to determine whether the wireless mobile node 78 is requesting to handoff a communications session to another PDSN. If at Step 254, the wireless mobile node 78 is requesting to handoff a communications session to another PDSN, Step 248 in FIG. 10A is executed as described above to determine if the wireless mobile node 78 has remaining pre-paid mobile services.

If the wireless mobile node 78 is not requesting to handoff a communications session to another PDSN, Step 252 is executed denying the wireless mobile node's 78 request to establish a second new communications session with the PDSN 178 since the wireless mobile node 78 already has an established communications session with the same PDSN 178.

Figure 11:
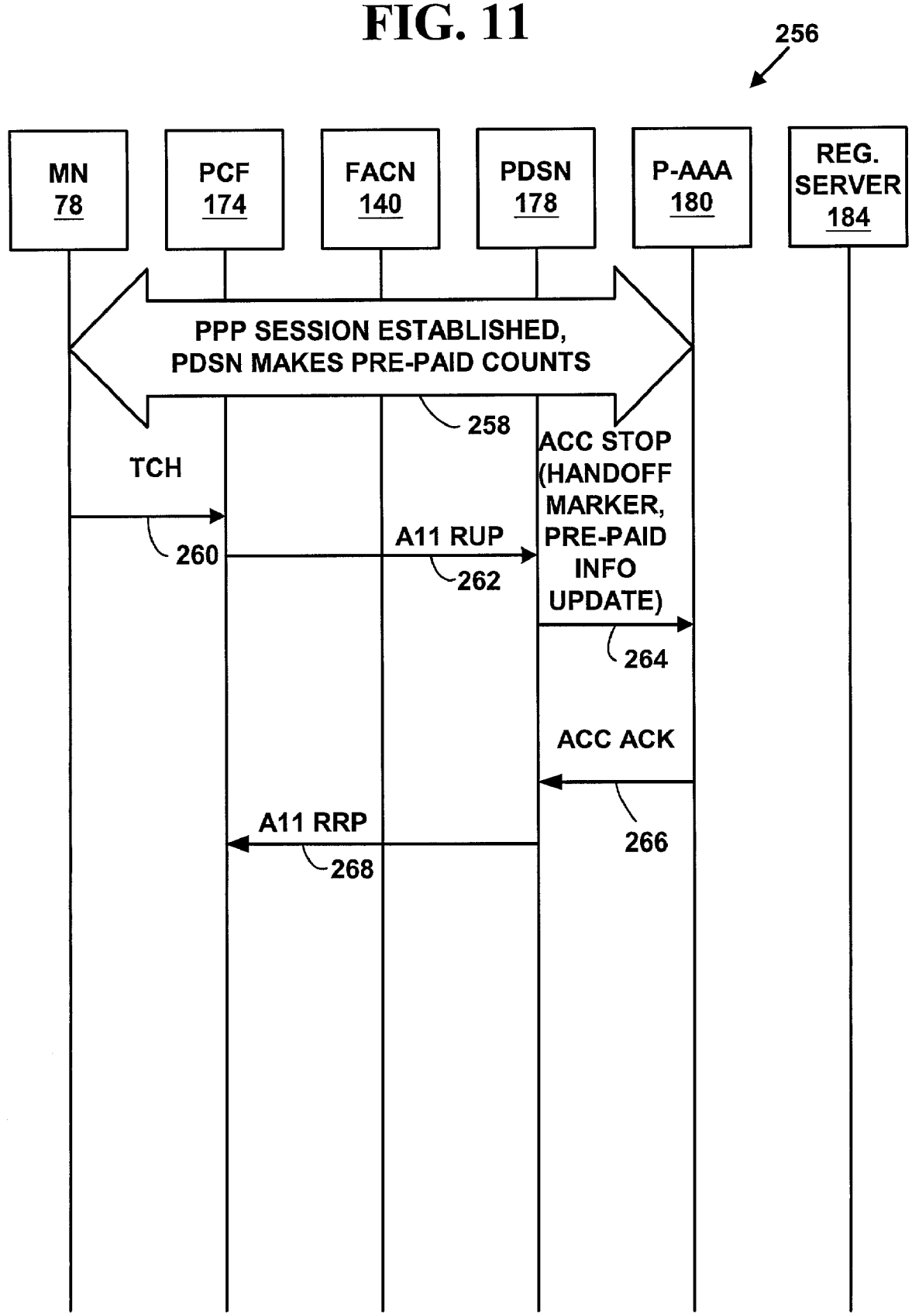
FIG. 11 is a block diagram illustrating an exemplary message flow for normal log-off of a wireless mobile node using pre-paid mobile services.

FIG. 11 is a block diagram illustrating an exemplary Message Flow 256 for normal log-off of a wireless mobile node using pre-paid mobile services. Message flow 256 includes messages 210–234 as described above for FIG. 9. However, these messages are not repeated on FIG. 11.

After a PPP 45 session 182 is established 258 for the wireless mobile node 78, the PDSN 178 keeps track of an amount of pre-paid mobile services used (e.g., seconds, bytes, packets, etc.) 258 as the pre-paid mobile services are used. The wireless mobile node 78 may desire to terminate its PPP 45 session 182. The wireless mobile node 78 terminates its PPP 45 session 182 with the PDSN 178 by sending a TCH update message 260 to the PCF 174. The PCF 174 sends a Mobile IP registration message 262 on an A11 channel to the PDSN 178 with a lifetime timer set equal to zero indicating that the wireless mobile node 78 should be de-registered. The PDSN 178 sends an accounting stop message 264 to the P-AAA server 180 to update the remaining amount of pre-paid mobile services for the mobile node 78. The accounting stop message includes the current digital cookie for the wireless mobile node 78. The P-AAA server 180 stores the remaining amount of pre-paid mobile services for the wireless mobile node 78 and sends the PDSN 178 an accounting update acknowledgement message 266. The PDSN 178 sends the PCF 140 a Mobile IP registration reply message 268 on an A11 channel indicating the mobile node 78 has been de-registered.

Figure 12:
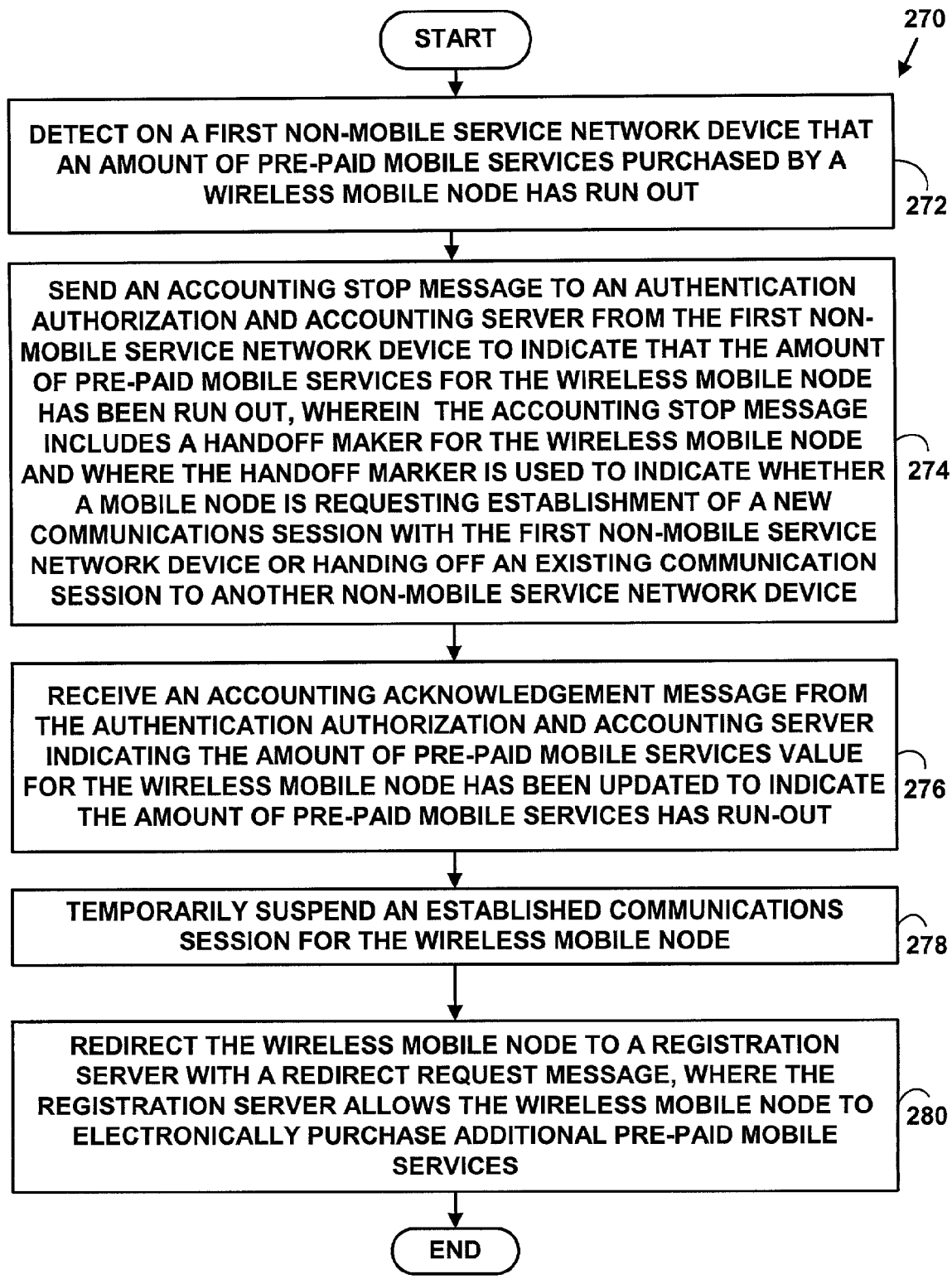
FIG. 12 is flow diagram illustrating a method for forcing re-direction handoffs for wireless mobile nodes using pre-paid mobile services on a mobile network.

PDSN Support for Forced Wireless Mobile Node Re-Direction when Pre-Paid Mobile Services Run Out FIG. 12 is flow diagram illustrating a Method 270 for forcing re-direction handoffs for wireless mobile nodes using pre-paid mobile services on a mobile network. At Step 272, a first non-mobile service network device detects that an amount of pre-paid mobile services purchased by a wireless mobile node has run out. At Step 274, the first non-mobile service network device sends an accounting stop message to an authentication authorization and accounting server to indicate that the pre-paid mobile services for the wireless mobile node has run out. The accounting stop message includes a handoff maker for the wireless mobile node. The handoff marker is used to indicate whether a mobile node is requesting establishment of a new communications session with the first non-mobile service network device or handing off an existing communication session to another non-mobile service network device. At Step 276, an accounting acknowledgement message is received from the authentication authorization and accounting server indicating the amount of pre-paid mobile services for the wireless mobile node has been updated to indicate the amount of pre-paid mobile services has run-out. At Step 278, an established communications session for the wireless mobile node is temporarily suspended. At Step 280, the wireless mobile node is re-directed to a registration server with a re-direct request message. The registration server allows the wireless mobile node to electronically purchase additional pre-paid mobile services immediately.

Method 270 is illustrated with an exemplary embodiment. However, the present invention is not limited to this embodiment and other embodiments with other components can also be used to practice the invention illustrated with Method 270.

In such an exemplary embodiment in FIG. 12 at Step 272, the PDSN 178 detects that an amount of pre-paid mobile services purchased by a wireless mobile node 78 has run-out. At Step 274, PDSN 178 sends an accounting stop message to the P-AAA server 180 to indicate that the amount of pre-paid mobile services for the wireless mobile node 78 has run-out. The accounting stop message includes a digital cookie for the wireless mobile node 78. The digital cookie is used to indicate whether the wireless mobile node is requesting establishment of a new communications session with the PDSN 178 or handing off an existing communication session to another PDSN.

At Step 276, an accounting acknowledgement message is received from P-AAA server 180 indicating the amount of pre-paid mobile services for the wireless mobile node 78 has been updated to indicate the amount of pre-paid mobile services has run-out. For example, the amount may be set to zero, minus one, etc. At Step 278, an established PPP 45 session 182 for the wireless mobile node 78 is temporarily suspended. At Step 280, the wireless mobile node 78 is re-directed to the registration server 184 with a re-direct request message. The registration server 184 allows the wireless mobile node 78 to electronically purchase additional pre-paid mobile services immediately.

In one embodiment of the present invention, the re-direct update message is a HTML message that re-directs to wireless mobile 78 to a secure web-page on the registration server 184. A user of the wireless mobile node 78 can then purchase additional mobile pre-paid services via the secure web-page. In another embodiment of the present invention, the re-direct update message is a XML message that allows the wireless mobile node 78 to automatically purchase additional mobile pre-paid services without user input. However, the present invention is not limited to such embodiments and other protocols and protocol messages can be used for the re-direct update messages.

In one embodiment of the present invention, at Step 280, the PDSN 178 applies a packet filter to all data packets to and from the wireless mobile node 78 to re-direct all data packets to the registration server 184. The packet filter will change all destination addresses in the data packets from the wireless mobile node 78 to an IP 48 address of the registration server 184. However, the present invention is not limited to such an embodiment and other embodiments can also be used to practice re-direction.

Figure 13:
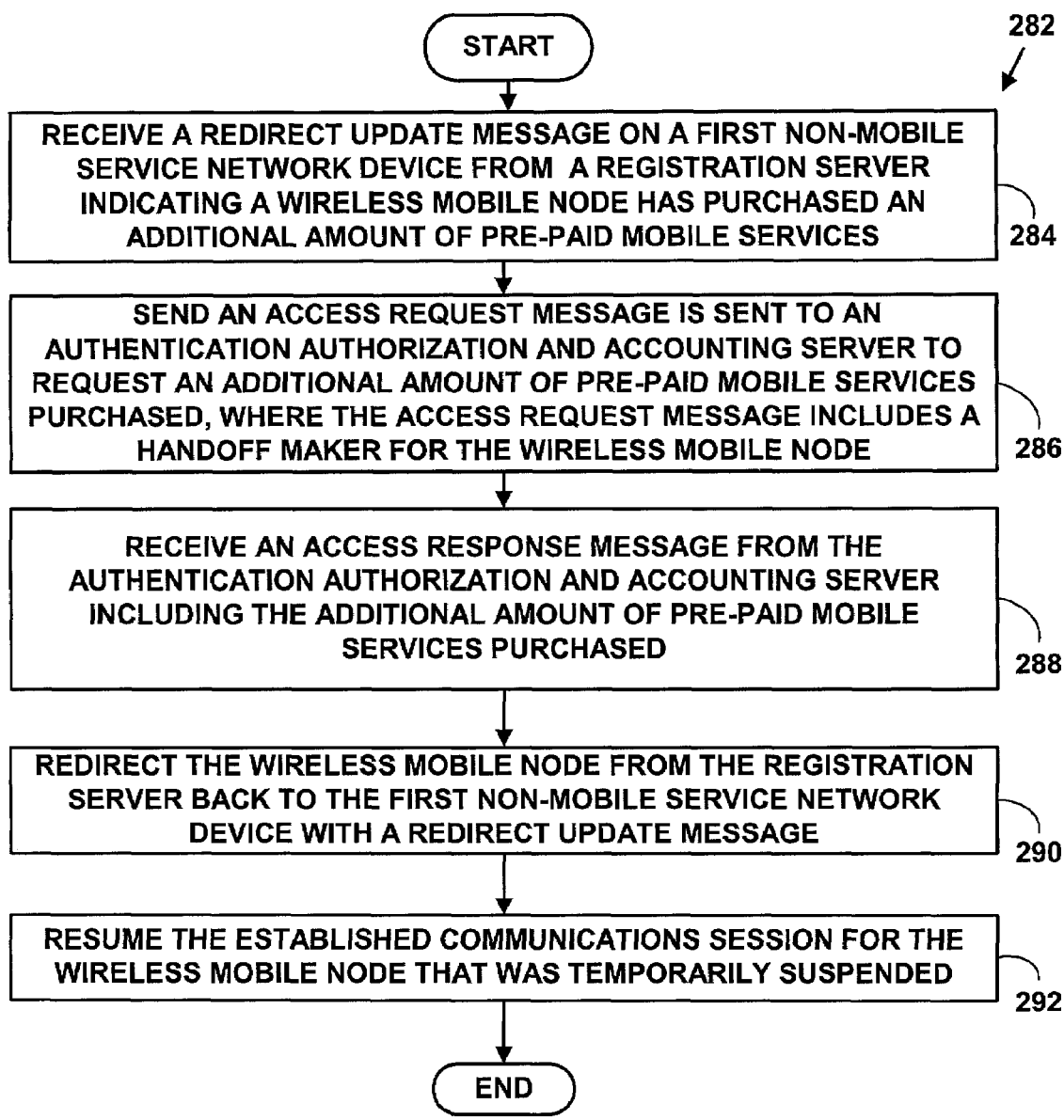
FIG. 13 is a flow diagram illustrating a method for ending re-direction for wireless mobile nodes using pre-paid mobile services on a mobile network.

In one embodiment of the present invention, Method 270 further comprises the additional steps illustrated in FIG. 13. However, the present invention is not limited to such an embodiment.

FIG. 13 is a flow diagram illustrating a Method 282 for ending re-direction for wireless mobile nodes using pre-paid mobile services on a mobile network. At Step 284, an re-direct update message is received on the first non-mobile service network device from the registration server indicating the wireless mobile node has purchased an additional amount of pre-paid mobile services. At Step 286, an access request message is sent to the authentication authorization and accounting server to request the additional amount of pre-paid mobile services purchased. The access request message includes a handoff marker for the wireless mode node. At Step 288, an access response message is received from the authentication authorization and accounting server including the additional amount of pre-paid mobile services purchased. At Step 290, the wireless mobile node is re-directed from the registration server back to the first non-mobile service network device with a re-direct update message. At Step 292, the established communications session for the wireless mobile node that was temporarily suspended is resumed.

If the wireless mobile node has not purchased any additional pre-paid mobile services, a re-direct update message is received on the first non-mobile service network device from the registration server indicating the wireless mobile node has not purchased an additional amount of pre-paid mobile services. The established communications session for the wireless mobile node that was temporarily suspended is then terminated.

Method 282 is illustrated with an exemplary embodiment. However, the present invention is not limited to this embodiment and other embodiment with other components can also be used to practice the invention illustrated with Method 282.

In such an exemplary embodiment, at Step 284, a re-direct update message is received on the PDSN 178 from the registration server 184 indicating the wireless mobile node 78 has purchased an additional amount of pre-paid mobile services. At Step 286, an access request message is sent to the P-AAA server 180 to request the additional amount of pre-paid mobile services purchased. At Step 288, an access response message is received from the P-AAA server 180 including the additional amount of pre-paid mobile services purchased. At Step 290, the wireless mobile node 78 is re-directed from the registration server 184 back to PDSN 178 with a re-direct update message. At Step 292, the established PPP 45 session 182 for the wireless mobile node 178 that was temporarily suspended is resumed.

In one embodiment of the present invention, at Step 290, the PDSN 178 removes the packet filter described above for data packets sent to and from the wireless mobile node to re-direct data traffic back to the PDSN 178. The re-directed update message includes a HTML, XML, WAP, or other type of re-direct update message. However, the present invention is not limited to such an embodiment, and other embodiments can also be used.

If the wireless mobile node 78 has not purchased any additional pre-paid mobile services, a re-direct update message is received on PDSN 178 from the registration server 184 indicating the wireless mobile node 78 has not purchased an additional amount of pre-paid mobile services. The established PPP 45 session 182 for the wireless mobile node 78 that was temporarily suspended is then terminated.

Figure 14:
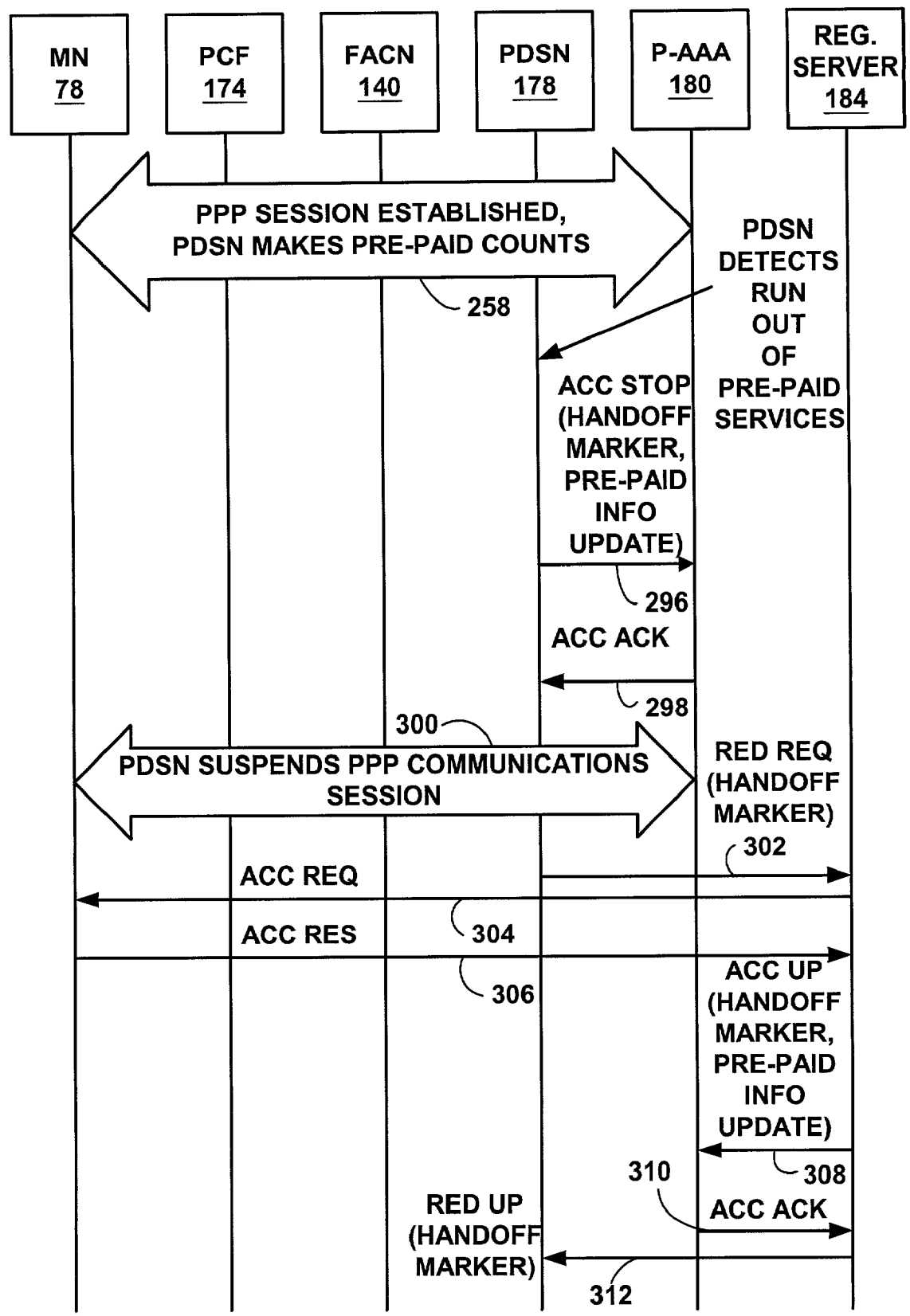
FIG. 14 is a block diagram illustrating an exemplary message flow for ending re-direction for wireless mobile nodes using pre-paid mobile services on a mobile network.

FIG. 14 is a block diagram illustrating an exemplary message flow 294 for Method 270 (FIG. 12). Message flow 294 includes messages 210–234 as described above for FIGS. 9, and message 258 from FIG. 11. However, only message 258 is repeated on FIG. 14.

The PDSN 178 making pre-paid mobile service counts 258 detects that an amount of pre-paid mobile services purchased by a wireless mobile node 78 has run out (Step 272). The PDSN 178 sends an accounting stop message 296 to the P-AAA server 180 to indicate that the amount of pre-paid mobile services for the wireless mobile node 78 has run-out. The accounting stop message 296 includes a digital cookie for the wireless mobile node 78. An accounting update message 298 is received from P-AAA server 180 indicating the amount of pre-paid mobile services for the wireless mobile node 78 has been updated to indicate the amount of pre-paid mobile services has run-out (Step 276). An established PPP session 182 for the wireless mobile node 78 is temporarily suspended 300 (Step 278). The PPP session 182 is "suspended" by applying a packet filter that will only send and receive PPP packets to and from the registration server 184 for the wireless mobile node 78. The wireless mobile node 78 is re-directed to the registration server 184 with a re-direct request message 302 (Step 280). The registration server 184 allows the wireless mobile node 78 to electronically purchase additional pre-paid mobile services.

FIG. 15 is a block diagram illustrating an exemplary message 314 flow for Method 282 (FIG. 13). Message flow 314 includes messages 210–234 as described above for FIGS. 9, message 258 from FIG. 11 and messages 296–312 from FIG. 14. Only message 312 from FIG. 14 is repeated on FIG. 15.

A re-direct update message 312 is received on the PDSN 178 from the registration server 184 indicating the wireless mobile node 78 has purchased an additional amount of pre-paid mobile services (Step 284). An access request message 316 including the digital cookie is sent to the P-AAA server 180 to request the additional amount of pre-paid mobile services purchased (Step 286). An access response message 318 is received from the P-AAA server 180 including the additional amount of pre-paid mobile services purchased (Step 288). The wireless mobile node 78 is re-directed from the registration server 184 back to PDSN 178 with a re-direct update message 320 (Step 290). The established PPP session 182 for the wireless mobile node 178 that was temporarily suspended is resumed 322 by removing the packet filter (Step 292).

Figure 16B:
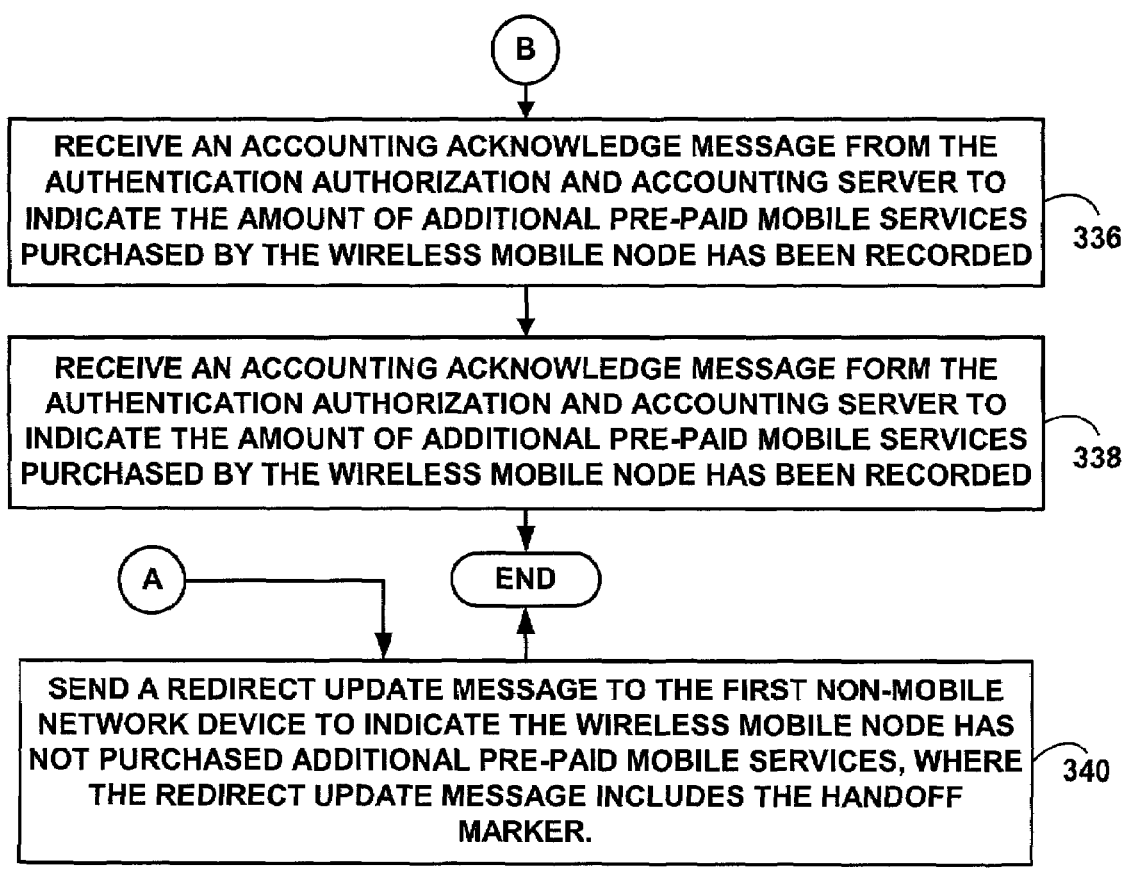

Registration Server Support for Forced Wireless Mobile Node Re-Direction when Pre-Paid Mobile Services Run Out FIGS. 16A and 16B are a flow diagram illustrating Method 324 for resuming forced re-direction handoffs for wireless mobile nodes using pre-paid mobile services on a mobile network. At Step 326, a redirection request message is received on registration server from a first non-mobile service network device for a wireless mobile node. The redirection request message indicates that an amount of pre-paid mobile services purchased by the wireless mobile node has run out. The redirection request message includes a handoff marker for the wireless mobile node. The handoff marker is used to indicate whether the wireless mobile node is requesting establishment of a new communications session with the first non-mobile service network device or handing off an existing communication session to another non-mobile service network device. At Step 328, an accounting request message is sent from the registration server to the wireless mobile node to request the wireless mobile node electronically purchase additional pre-paid mobile services. At Step 330, an accounting response message is received from wireless mobile node. At Step 332, a test is conducted to determine with the accounting response message whether the wireless mobile node has electronically purchased any additional pre-paid mobile services.

If the wireless mobile node has electronically purchased any additional pre-paid mobile services, at Step 334, an accounting update message is sent to an authentication authorization and accounting server. The accounting update message includes an amount of additional pre-paid mobile services purchased by the wireless mobile node and the handoff marker for the wireless mobile node. At Step 336, an accounting acknowledge message is received form the authentication authorization and accounting server to indicate the amount of additional pre-paid mobile services purchased by the mobile node has been recorded. At Step 338, a re-direct update message is sent to the first non-mobile network device to indicate the wireless mobile node has purchased additional pre-paid mobile services. The redirect update message includes the handoff marker.

If the wireless mobile node has not electronically purchased any additional pre-paid mobile services, at Step 340, a re-direct update message is sent to the first non-mobile network device to indicate the wireless mobile node has not purchased additional pre-paid mobile services. The re-direct update message includes the handoff marker. The first non-mobile service network device will terminated the communications suspended before the re-direction to the registration server.

Method 324 is illustrated with an exemplary embodiment. However, the present invention is not limited to this embodiment and other embodiments with other components can also be used to practice the invention illustrated with Method 324.

In such an exemplary embodiment at Step 326, a redirection request message is received on the registration server 184 from the PDSN 178 for a wireless mobile node 78 that has run out of pre-paid mobile services. The redirection request message includes a digital cookie for the wireless mobile node 78.

At Step 328, an accounting request message is sent from the registration server 184 to the wireless mobile node 78 to request the wireless mobile node electronically purchase additional pre-paid mobile services. The additional pre-paid mobile services can be purchased electronically via credit-card, debit-card, checking account, banking account, etc., or using other types of electronic card ("e-card") or electronic commerce ("e-commerce") or electronic money ("e-money") currencies. The additional pre-paid services can be purchased with user input or automatically without user input as was described above.

At Step 330, an accounting response message is received from wireless mobile node 78. Step 330 is illustrated as one message. However, Step 330 may comprise plural accounting message to request, accept, verify data used to provide additional pre-paid mobile services.

At Step 332, a test is conducted to determine with the accounting response message whether the wireless mobile node 78 has electronically purchased any additional pre-paid mobile services. If the wireless mobile node 78 has electronically purchased any additional pre-paid mobile services, at Step 334, an accounting update message is sent the P-AAA server 180. The accounting update message includes an amount of additional pre-paid mobile services purchased by the wireless mobile node 78 and the handoff marker for the wireless mobile node 78.

At Step 334, an accounting acknowledge message is received form the P-AAA server 180 to indicate the amount of additional pre-paid mobile services purchased by the wireless mobile node 78 has been recorded. At Step 336, a re-direct update message is sent to the PSDN 178 to indicate the wireless mobile node 78 has purchased additional pre-paid mobile services. The redirect update message includes the handoff marker.

Steps 326–336 of Method 324 are illustrated by messages 302–312 on FIG. 14.

A redirection request message 302 is received on the registration server 184 from the PDSN 178 for a wireless mobile node 78 that has run out of pre-paid mobile services. The redirection request message includes a digital cookie for the wireless mobile node 78 (Step 326).

An accounting request message 304 is sent from the registration server 184 to the wireless mobile node 78 to request the wireless mobile node electronically purchase additional pre-paid mobile services (Step 328). An accounting response message 306 is received from wireless mobile node 78 (Step 330). A test is conducted to determine with the accounting response message whether the wireless mobile node 78 has electronically purchased any additional pre-paid mobile services (Step 332).

If the wireless mobile node 78 has electronically purchased any additional pre-paid mobile services, an accounting update message 308 is sent the P-AAA server 180. The accounting update message 308 includes an amount of additional pre-paid mobile services purchased by the wireless mobile node 78 and the digital cookie for the wireless mobile node 78 (Step 334). An accounting acknowledgment message 310 is received from the P-AAA server 180 to indicate the amount of additional pre-paid mobile services purchased by the wireless mobile node 78 has been recorded (Step 336). A re-direct update message 312 is sent to the PSDN 178 to indicate the wireless mobile node 78 has purchased additional pre-paid mobile services (Step 338). The redirect update message 312 includes the handoff marker.

Hard Handoff Support for Wireless Mobile Nodes Using Pre-Paid Mobile Services

FIGS. 17A and 17B are a flow chart illustrating a Method 342 for allowing hard handoffs for wireless mobile nodes using pre-paid mobile services on a mobile network.

In FIG. 17A at Step 344, a first set-up message is received on a non-mobile network device control node from a wireless mobile node to hand-off an existing communications session for the wireless mobile node from an old non-mobile service network device to the new non-mobile service network device. At Step 346, a first request message is received from the new non-mobile service network device indicating the existing communications session will be handed off to the new non-mobile service network device.

At Step 348, a second update message is sent to the old non-mobile service network device indicating that the existing communications session will be handed off to the new non-mobile service network device. At Step 350, first accounting update message is sent to an authentication authorization and accounting server to update a remaining amount of pre-paid mobile services for the wireless mobile node. The accounting update message includes a handoff maker for the wireless mobile node. The handoff marker is used to indicate whether the wireless mobile node is requesting establishment of a new communications session with the first non-mobile service network device or handing off an existing communication session to the new non-mobile service network device. At Step 352, an accounting acknowledgement message is received from the authentication authorization and accounting server indicating the amount of pre-paid mobile services for the wireless mobile node has been updated.

In FIG. 17B at Step 354, a first acknowledgement message is received from the old non-mobile service network device indicating the old non-mobile service network device has accepted hand-off of the existing communications session to the new non-mobile service network device. At Step 356, a second acknowledgement message is sent to the new non-mobile service network device indicating the existing communications session will be handed off to the new non-mobile service network device. The second acknowledgement message includes the handoff marker. As was described above, the handoff marker was generated by the old non-mobile service network device and is used to indicate whether the wireless mobile node is requesting establishment of a new communications session with the old non-mobile service network device or handing off an existing communication session to the new non-mobile service network device.

At Step 358, a third update message is received from the new non-mobile network device indicating the existing communications session has been successfully handed off to the new non-mobile service network device. The third update message includes the handoff marker. At Step 360, a third acknowledgement message is sent to the new non-mobile network device acknowledging the existing communications session has been successfully handed off to the new non-mobile service network device.

Method 342 is illustrated with an exemplary embodiment. However, the present invention is not limited to this embodiment and other embodiments with other components can also be used to practice the invention illustrated with Method 342.

In such an exemplary embodiment, in FIG. 17A at Step 344, a Mobile IP registration request message is received on an A11 channel on the FACN 140 from the wireless mobile node 78 to hand-off an existing PPP 45 communications session 182 for the wireless mobile node 78 from an old PSDN 178 to a new PSDN. At Step 346, a first Mobile IP registration request message is received from the new PSDN indicating the new PSDN will accept hand-off of the existing communications session. At Step 348, a second Mobile IP registration update message is sent on an A11 channel to the old PSDN 178 indicating that the existing communications session will be handed off to the new PSDN. At Step 350, a first accounting update message is sent to the P-AAA server 180 to update a remaining amount of pre-paid mobile services for the wireless mobile node 78. The accounting update message includes digital cookie for the wireless mobile node 78.

As was described above, the digital cookie was generated by the old PSDN 178 and is used to indicate whether the wireless mobile node 78 is requesting establishment of a new communications session with the old PSDN 178 or handing off an existing communication session to the PDSN. At Step 352, an accounting acknowledgement message is received from P-AAA server 180 on an A11 channel indicating the amount of pre-paid mobile services for the wireless mobile node 78 has been updated.

In FIG. 17B at Step 354, a first Mobile IP registration acknowledgement message is received on an A11 channel from the old PDSN 178 indicating the old PDSN 178 will accept handoff of the existing communications session on the new PDSN. At Step 356, a second Mobile IP registration acknowledgement message is sent on an A11 channel to the new PDSN indicating the existing communications session will be handed off to the new PDSN. The second Mobile IP registration acknowledgement message includes the digital cookie. At Step 358, a third Mobile IP registration update message is received on an A11 channel from the new PDSN indicating the new PDSN has accepted the new communications session. The third Mobile IP registration update message includes the digital cookie. At Step 360, a third Mobile IP registration acknowledgement message is sent on an A11 channel to the new PDSN indicating the existing communications session has been successfully handed off to the new PDSN.

The old PDSN 178 executes Method 186 (FIG. 8) to initiate a new PPP 45 communications 182 for the wireless mobile node 78 and create a new digital cookie and/or modify any existing digital cookie.

The P-AAA server 180 executes Method 240 (FIG. 10) to in connection with the FACN 140 executing Method 342. As was discussed above, the P-AAA server 180 uses the digital cookie generated by the old PDSN 178 to determine if a communications session is a new communications on the old PDSN 178 or a hand-off of an existing communications session to a new PDSN. The P-AAA server 180 also uses the digital cookie to prevent a wireless mobile node 78 from establishing two communication sessions to the same PDSN 178.

Hard Handoff Message Flow

Figure 18A:
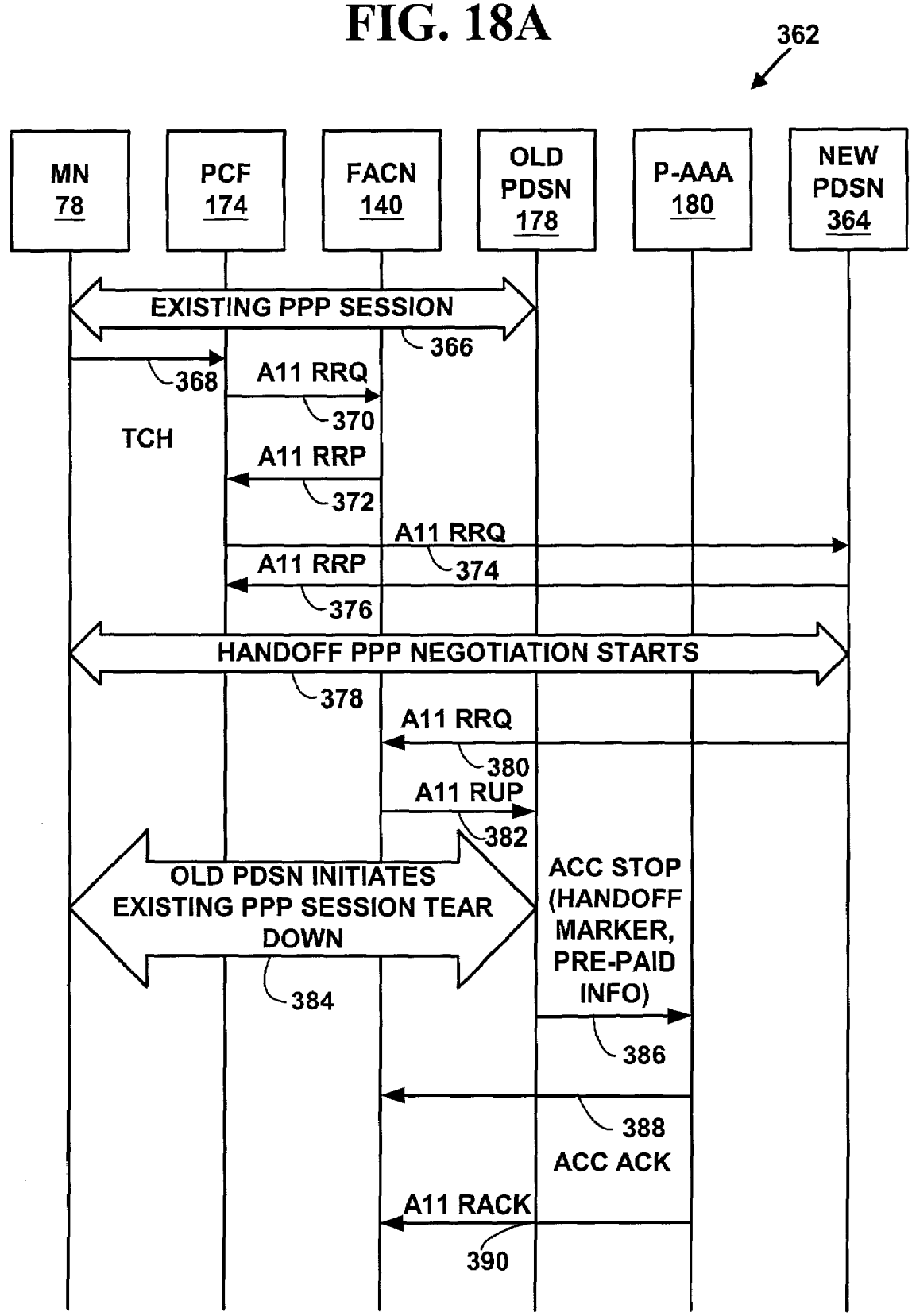
FIGS. 18A and 18B are a block diagram illustrating an exemplary message flow for allowing hard handoffs for wireless mobile nodes using pre-paid mobile services on a mobile network.
Figure 18B:
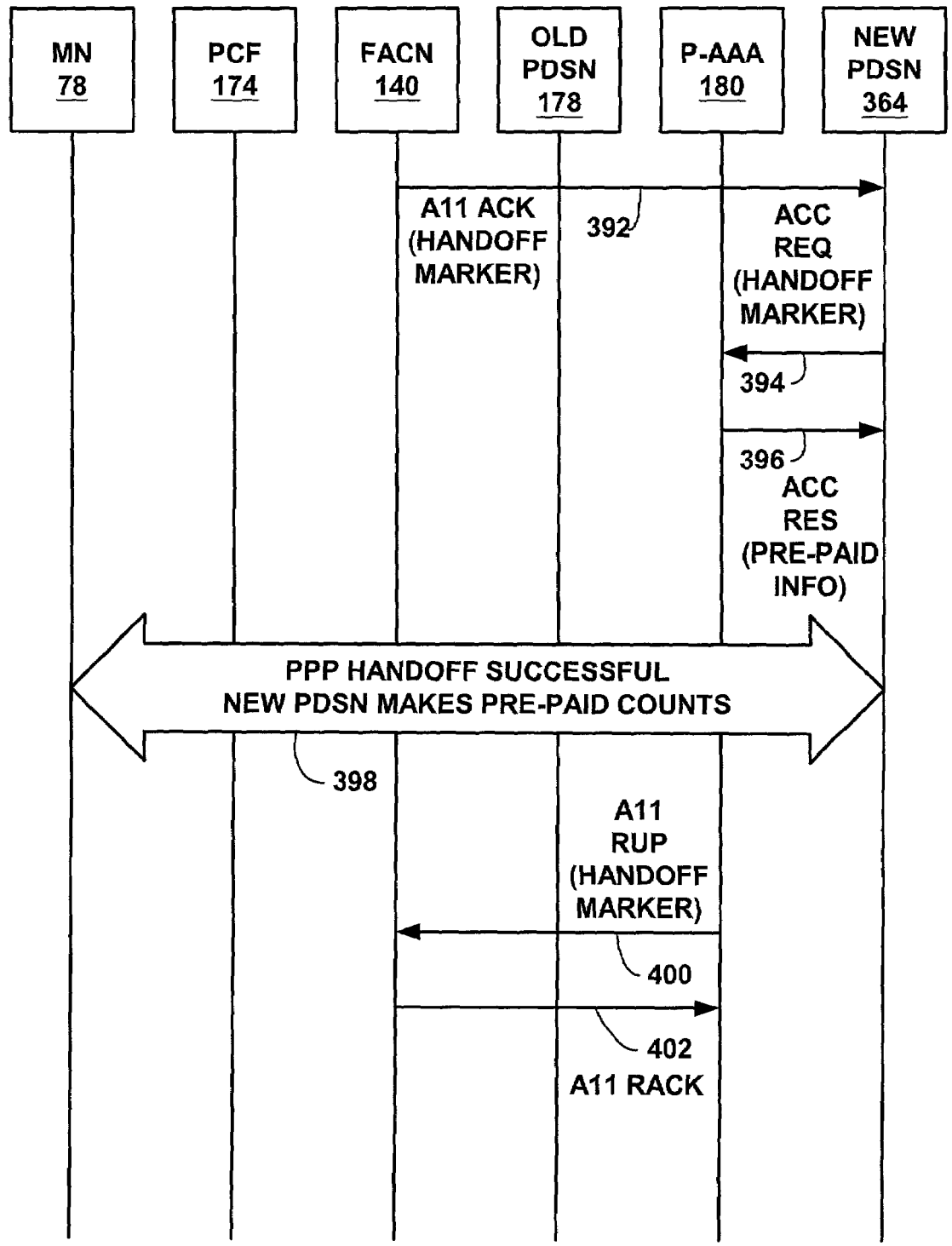

FIGS. 18A and 18B are a block diagram illustrating an exemplary message flow for a hand off of an existing communications session between a new and an old PDSN. Message flow 362 includes messages 210–234 as described above for FIGS. 9, message 258 from FIG. 11. These messages have not been repeated on FIG. 18.

In FIG. 18A, the wireless mobile node 78 has an established PPP 45 communications session 366 with the old PDSN 178. The wireless mobile node 78 roams away from its current location to a new location and initiates a hard handoff to a new PDSN 364 by sending a new TCF message 368 to the PCF 174. The PCF 174 sends a Mobile IP registration request message 370 on an A11 channel to the FACN 140 to hand-off the existing PPP 45 communications session 366 for the wireless mobile node 78 from an old PDSN 178 to the new PDSN 364. The FACN 140 sends a Mobile IP registration response message 370 back to the PCF 174 indicating the hard handoff will be initiated.

The PCF 174 sends a Mobile IP registration request message 374 on an A11 channel to the new PDSN 364 to indicate that the wireless mobile node 78 desires to handoff an existing PPP 45 communications session 366 to the new PDSN 364. The new PDSN 364 sends a Mobile IP registration response message 376 to the PCF 174 indicating that it will accept the handoff. The wireless mobile node 78 begins new PPP 45 negotiations 378 with the new PDSN 364.

The new PDSN 364 sends a Mobile IP registration request message 380 to the FACN 140 indicating that new PPP 45 negotiations 378 have begun with the wireless mobile node 78. The FACN 140 sends a Mobile IP registration update message 382 to the old PDSN 178 to request tear down of the existing PPP 47 communications session 366.

The old PDSN 178 initiates tear down 384 of the existing PPP 45 communications session between the old PDSN 178 and the wireless mobile node 78. The old PDSN 178 sends an accounting stop message 386 to the P-AAA server 180 to update a remaining amount of pre-paid mobile services for the wireless mobile node 78. The accounting stop message includes digital cookie for the wireless mobile node 78. The P-AAA server 180 sends an accounting acknowledgement message 388 to the FACN 140 indicating the amount of pre-paid mobile services for the wireless mobile node 78 has been updated. P-AAA server 180 sends a Mobile IP registration acknowledgement message 390 to the old PDSN 178 when the old PPP 45 session has been torn down.

In FIG. 18B, the FACN 140 sends a Mobile IP registration acknowledgement message 392 on an A11 channel to the new PDSN 364 to indicate that the old PPP 45 session has been torn down. The message 392 includes the digital cookie generated by the old PDSN 178. The new PDSN 364 sends an access request message 394 to the P-AAA 180 to request an amount of remaining pre-paid mobile services for the wireless mobile node 78. The message 394 includes the digital cookie. The P-AAA 182 sends an access response message 396 to the new PDSN 364 with an amount of remaining pre-paid mobile services for the wireless mobile node 78.

The PPP 45 negotiations between the wireless mobile node 78 and the new PDSN 364 continues, a PPP 45 session is established, and the new PDSN counts pre-paid mobile services used 398. The new PDSN 364 sends a Mobile IP registration update message 400 on an A11 channel to the FACN 140 with the current digital cookie for the wireless mobile node 78. The FACN 140 updates the digital cookie information (if necessary). The FACN 140 sends a Mobile IP registration acknowledgement message 402 to the new PDSN 364 acknowledging receipt of the digital cookie for the wireless mobile node 78. A hard handoff of a PPP 45 session has been completed between the old PDSN 178 and the new PDSN 364 for the wireless mobile node 78.

Embodiments of the present invention have been described with respect to a wireless mobile node 78. However, the present invention can also be practiced with a wired mobile node 78, and is not limited to wireless mobile nodes 78. In addition, the present invention can be practiced on other than 3G mobile networks (e.g., 2G 2.5G, 4G, etc.) and practiced with combinations of wireless and wired mobile nodes 78 and combinations of 2G, 2.5G and 3G wireless and wired mobile network equipment or components.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments in hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention.

For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method for allowing handoffs for wireless mobile nodes using pre-paid mobile services on a mobile network, comprising:

receiving a first request message on a first non-mobile service network device on a mobile network from a wireless mobile node to establish a communications session for the wireless mobile node;

sending an update message from the first non-mobile service network device to a second non-mobile network device control node requesting a handoff marker, wherein the handoff marker is used to determine if the communications session to be established is a new communications session or a handoff communications session;

receiving a response message on the first non-mobile service network device from the second non-mobile network device control node;

determining on the first non-mobile network service device whether the response message includes a handoff marker, and if not, generating a new handoff marker with a value indicating the wireless mobile node is establishing a new communications session;

sending the generated handoff marker to an authentication authorization and accounting server in an access request message to allow the authentication authorization and accounting server to differentiate between the establishment of a new communications session and a handoff of an existing communications session to another non-mobile service network device;

receiving an access response message from the authentication authorization and accounting server, wherein the access response message includes account information for pre-paid mobile services purchased for the wireless mobile node that will be used by the first non-mobile service network device to provide pre-paid billing services for the wireless mobile node;

sending the generated handoff marker to the second non-mobile network device control node in an update message, wherein the second non-mobile network device uses the generated handoff marker in subsequent messages sent to the first non-mobile network service device to allow handoff and redirection of communications sessions established by the wireless mobile node.

2. The method of claim 1 further comprising a computer readable medium having stored therein instructions for causing a processor to execute the steps of the method.

3. The method of claim 1 wherein the first non-mobile service network device includes a packet data service node.

4. The method of claim 1 wherein the second non-mobile network device control node includes a Mobile Internet Protocol foreign agent control node or a Mobile Internet Protocol foreign agent.

5. The method of claim 1 wherein the mobile network includes a third-generation wireless mobile network.

6. The method of claim 1 wherein the wireless mobile node includes a wireless Mobile Internet Protocol mobile node.

7. The method of claim 1 wherein the handoff marker is a digital cookie.

8. The method of claim 1 further comprising:

determining on the first non-mobile network device whether the response message includes a handoff marker, and if so, changing the value of the handoff marker to create a modified handoff marker to indicate the wireless mobile node is undergoing a handoff of an existing communications session to another non-mobile service network device; and sending the modified handoff marker to the authentication authorization and accounting server in an access request message to allow the authentication authorization and accounting server to differentiate between the establishment of a new communications session and the handoff of an existing communications session to another non-mobile service network device.

9. The method of claim 1 wherein the pre-paid mobile services include a specific amount of transmission time, a specific amount of receive time, a specific number of data bytes received, a specific number of data bytes transmitted, a specific number of data packets received, or a specific number of data packets transmitted.

* * * * *